United States Patent
Zhamu et al.

(10) Patent No.: US 11,641,012 B2
(45) Date of Patent: May 2, 2023

(54) PROCESS FOR PRODUCING GRAPHENE/SILICON NANOWIRE HYBRID MATERIAL FOR A LITHIUM-ION BATTERY

(71) Applicant: Nanotek Instruments, Inc., Dayton, OH (US)

(72) Inventors: Aruna Zhamu, Springboro, OH (US); Yu-Sheng Su, Dayton, OH (US); Jun Yin, Miamisburg, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 560 days.

(21) Appl. No.: 16/246,868

(22) Filed: Jan. 14, 2019

(65) Prior Publication Data

US 2020/0227734 A1 Jul. 16, 2020

(51) Int. Cl.
*H01M 4/36* (2006.01)
*H01M 4/133* (2010.01)
(Continued)

(52) U.S. Cl.
CPC ......... *H01M 4/366* (2013.01); *H01M 4/0404* (2013.01); *H01M 4/133* (2013.01); *H01M 4/134* (2013.01); *H01M 4/1393* (2013.01); *H01M 4/1395* (2013.01); *H01M 4/386* (2013.01); *H01M 4/587* (2013.01); *H01M 10/0525* (2013.01); *H01M 2004/027* (2013.01)

(58) Field of Classification Search
CPC ...... H01M 4/366; H01M 4/133; H01M 4/134; H01M 4/1393; H01M 4/386; H01M 4/587; H01M 4/0404; H01M 10/0525; H01M 4/1395; H01M 2004/027; H01M 4/0471; H01M 4/362; B82Y 40/00; Y02E 60/10
USPC ....................................... 429/623.5
See application file for complete search history.

(56) References Cited

U.S. PATENT DOCUMENTS 7,071,258 B1   7/2006   Jang et al.
7,745,047 B2   6/2010   Zhamu et al.
(Continued)

OTHER PUBLICATIONS

Jang et al., "Processing of Nano Graphene Platelets (NGPs) and NGP Nanocomposites: A Review" J. Materials Sci. (2008) vol. 43, pp. 5092-5101.

(Continued)

*Primary Examiner* — Gary D Harris

(57) ABSTRACT

A process for producing a graphene/Si nanowire hybrid material, comprising: (a) dispersing catalyst metal-coated Si particles, graphene sheets, and an optional blowing agent in a liquid medium to form a graphene/Si dispersion; (b) dispensing and depositing the dispersion onto a supporting substrate to form a wet layer and removing the liquid medium from the wet layer to form a dried layer of graphene/Si mixture material; (c) exposing the dried layer to a high temperature environment, from 300° C. to 2,000° C., to induce volatile gas molecules from graphene sheets or to activate the blowing agent for producing the graphene foam and to enable a catalyst metal-catalyzed growth of multiple Si nanowires emanated from Si particles as a feed material in pores of the foam to form a layer of the hybrid material; and (d) operating a mechanical breaking means to produce the Si nanowire/graphene hybrid material in a powder mass form.

41 Claims, 7 Drawing Sheets

(51) Int. Cl.
    *H01M 4/134*    (2010.01)
    *H01M 4/1393*   (2010.01)
    *H01M 4/38*     (2006.01)
    *H01M 4/587*    (2010.01)
    *H01M 4/04*     (2006.01)
    *H01M 10/0525*  (2010.01)
    *H01M 4/1395*   (2010.01)
    *H01M 4/02*     (2006.01)

(56) References Cited

U.S. PATENT DOCUMENTS

| | | |
|---|---|---|
| 2005/0136330 A1 | 6/2005 | Mao et al. |
| 2005/0271574 A1 | 12/2005 | Jang et al. |
| 2008/0048152 A1 | 2/2008 | Jang et al. |
| 2009/0305135 A1 | 12/2009 | Shi et al. |
| 2010/0143798 A1 | 6/2010 | Zhamu et al. |
| 2013/0089784 A1 | 4/2013 | Cho et al. |
| 2015/0044564 A1 | 2/2015 | Wang et al. |
| 2016/0285084 A1* | 9/2016 | Fang .................... H01M 4/366 |
| 2017/0200938 A1 | 7/2017 | Zhamu et al. |
| 2017/0207493 A1 | 7/2017 | Mukherjee et al. |
| 2017/0222219 A1 | 8/2017 | Sun |
| 2018/0019468 A1 | 1/2018 | Zhu et al. |
| 2018/0261847 A1 | 9/2018 | Su et al. |

OTHER PUBLICATIONS

PCT/US20/13306 International Search Report and Written Opinion dated Aug. 13, 2020, 14 pages.
U.S. Appl. No. 16/246,896 Nonfinal Office Action dated Jan. 26, 2021, 10 pages.

* cited by examiner

US 11,641,012 B2

PROCESS FOR PRODUCING GRAPHENE/SILICON NANOWIRE HYBRID MATERIAL FOR A LITHIUM-ION BATTERY

FIELD OF THE INVENTION

The present invention relates generally to the field of rechargeable lithium-ion battery and, more particularly, to an anode hybrid material containing silicon nanowires and graphene sheets, and the process for producing same.

BACKGROUND OF THE INVENTION

A unit cell or building block of a lithium-ion battery is typically composed of an anode active material layer, an anode or negative electrode (typically a layer containing an anode active material responsible for storing lithium therein, a conductive additive, and a resin binder), an electrolyte and porous separator, a cathode or positive electrode (a layer containing a cathode active material responsible for storing lithium therein, a conductive additive, and a resin binder), and a separate cathode current collector. The electrolyte is in ionic contact with both the anode active material and the cathode active material. A porous separator is not required if the electrolyte is a solid-state electrolyte.

The most commonly used anode active materials for lithium-ion batteries are natural graphite and synthetic graphite (or artificial graphite) that can be intercalated with lithium and the resulting graphite intercalation compound (GIC) may be expressed as $Li_xC_6$, where x is typically less than 1. The maximum amount of lithium that can be reversibly intercalated into the interstices between graphene planes of a perfect graphite crystal corresponds to x=1, defining a theoretical specific capacity of 372 mAh/g.

Graphite or carbon anodes can have a long cycle life due to the presence of a protective solid-electrolyte interface layer (SEI), which results from the reaction between lithium and the electrolyte (or between lithium and the anode surface/edge atoms or functional groups) during the first several charge-discharge cycles. The lithium in this reaction comes from some of the lithium ions originally intended for the charge transfer purpose. As the SEI is formed, the lithium ions become part of the inert SEI layer and become irreversible, i.e. these positive ions can no longer be shuttled back and forth between the anode and the cathode during charges/discharges. Therefore, it is desirable to use a minimum amount of lithium for the formation of an effective SEI layer. In addition to SEI formation, the irreversible capacity loss $Q_{ir}$ can also be attributed to graphite exfoliation caused by electrolyte/solvent co-intercalation and other side reactions.

In addition to carbon- or graphite-based anode materials, other inorganic materials that have been evaluated for potential anode applications include metal oxides, metal nitrides, metal sulfides, and the like, and a range of metals, metal alloys, and intermetallic compounds that can accommodate lithium atoms/ions or react with lithium. Among these materials, lithium alloys having a composition formula of $Li_aA$ (A is a metal or semiconductor element, such as Al and Si, and "a" satisfies 0<a≤5) are of great interest due to their high theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g). However, as schematically illustrated in FIG. 1, in an anode composed of these high-capacity materials, severe pulverization (fragmentation of the alloy particles) occurs during the charge and discharge cycles due to severe expansion and contraction of the anode active material particles induced by the insertion and extraction of the lithium ions in and out of these particles. The expansion and contraction, and the resulting pulverization, of active material particles, lead to loss of contacts between active material particles and conductive additives and loss of contacts between the anode active material and its current collector. This degradation phenomenon is illustrated in FIG. 1. These adverse effects result in a significantly shortened charge-discharge cycle life.

To overcome the problems associated with such mechanical degradation, three technical approaches have been proposed:

(1) reducing the size of the active material particle, presumably for the purpose of reducing the total strain energy that can be stored in a particle, which is a driving force for crack formation in the particle. However, a reduced particle size implies a higher surface area available for potentially reacting with the liquid electrolyte to form a higher amount of SEI. Such a reaction is undesirable since it is a source of irreversible capacity loss.

(2) depositing the electrode active material in a thin film form directly onto a current collector, such as a copper foil. However, such a thin film structure with an extremely small thickness-direction dimension (typically much smaller than 500 nm, often necessarily thinner than 100 nm) implies that only a small amount of active material can be incorporated in an electrode (given the same electrode or current collector surface area), providing a low total lithium storage capacity and low lithium storage capacity per unit electrode surface area (even though the capacity per unit mass can be large). Such a thin film must have a thickness less than 100 nm to be more resistant to cycling-induced cracking, further diminishing the total lithium storage capacity and the lithium storage capacity per unit electrode surface area. Such a thin-film battery has very limited scope of application. A desirable and typical electrode thickness is from 100 μm to 200 μm. These thin-film electrodes (with a thickness of <500 nm or even <100 nm) fall short of the required thickness by three (3) orders of magnitude, not just by a factor of 3.

(3) using a composite composed of small electrode active particles protected by (dispersed in or encapsulated by) a less active or non-active matrix, e.g., carbon-coated Si particles, sol gel graphite-protected Si, metal oxide-coated Si or Sn, and monomer-coated Sn nanoparticles. Presumably, the protective matrix provides a cushioning effect for particle expansion or shrinkage, and prevents the electrolyte from contacting and reacting with the electrode active material. Examples of anode active particles are Si, Sn, and $SnO_2$. Unfortunately, when an active material particle, such as Si particle, expands (e.g. up to a volume expansion >300%) during the battery charge step, the protective coating is easily broken due to the mechanical weakness and/o brittleness of the protective coating materials. There has been no high-strength and high-toughness material available that is itself also lithium ion conductive.

It may be further noted that the coating or matrix materials used to protect active particles (such as Si and Sn) are carbon, sol gel graphite, metal oxide, monomer, ceramic, and lithium oxide. These protective materials are all very brittle, weak (of low strength), and/or non-conducting (e.g., ceramic or oxide coating). Ideally, the protective material should meet the following requirements: (a) The coating or matrix material should be of high strength and stiffness so that it can help to refrain the electrode active material particles, when lithiated, from expanding to an excessive extent. (b) The protective material should also have high fracture toughness or high resistance to crack formation to avoid disintegration during repeated cycling. (c) The protective material must be inert (inactive) with respect to the electrolyte, but be a good lithium ion conductor. (d) The protective material must not provide any significant amount of defect sites that irreversibly trap lithium ions. (e) The protective material must be lithium ion-conducting as well as electron-conducting. The prior art protective materials all fall short of these requirements. Hence, it was not surprising to observe that the resulting anode typically shows a reversible specific capacity much lower than expected. In many cases, the first-cycle efficiency is extremely low (mostly lower than 80% and some even lower than 60%). Furthermore, in most cases, the electrode was not capable of operating for a large number of cycles. Additionally, most of these electrodes are not high-rate capable, exhibiting unacceptably low capacity at a high discharge rate.

Due to these and other reasons, most of prior art composite electrodes have deficiencies in some ways, e.g., in most cases, less than satisfactory reversible capacity, poor cycling stability, high irreversible capacity, ineffectiveness in reducing the internal stress or strain during the lithium ion insertion and extraction steps, and other undesirable side effects.

Complex composite particles of particular interest are a mixture of separate Si and graphite particles dispersed in a carbon matrix; e.g. those prepared by Mao, et al. ["Carbon-coated Silicon Particle Powder as the Anode Material for Lithium Batteries and the Method of Making the Same," US 2005/0136330 (Jun. 23, 2005)]. Also of interest are carbon matrix-containing complex nano Si (protected by oxide) and graphite particles dispersed therein, and carbon-coated Si particles distributed on a surface of graphite particles Again, these complex composite particles led to a low specific capacity or for up to a small number of cycles only. It appears that carbon by itself is relatively weak and brittle and the presence of micron-sized graphite particles does not improve the mechanical integrity of carbon since graphite particles are themselves relatively weak. Graphite was used in these cases presumably for the purpose of improving the electrical conductivity of the anode material. Furthermore, polymeric carbon, amorphous carbon, or pre-graphitic carbon may have too many lithium-trapping sites that irreversibly capture lithium during the first few cycles, resulting in excessive irreversibility.

In summary, the prior art has not demonstrated a composite material that has all or most of the properties desired for use as an anode material in a lithium-ion battery. Thus, there is an urgent and continuing need for a new anode for the lithium-ion battery that has a high cycle life, high reversible capacity, low irreversible capacity, small particle sizes (for high-rate capacity), and compatibility with commonly used electrolytes. There is also a need for a method of readily or easily producing such an anode in a cost-effective manner.

The constituent graphene planes of a graphite crystallite in a natural or artificial graphite particle can be exfoliated and extracted or isolated to obtain individual graphene sheets of carbon atoms provided the inter-planar van der Waals forces can be overcome. An isolated, individual graphene sheet of carbon atoms is commonly referred to as single-layer graphene. A stack of multiple graphene planes bonded through van der Waals forces in the thickness direction with an inter-graphene plane spacing of approximately 0.3354 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes (commonly referred to as few-layer graphene in scientific community). Single-layer graphene and multi-layer graphene sheets are collectively called "nanographene platelets" (NGPs). Graphene or graphene oxide sheets/platelets (collectively, NGPs) are a new class of carbon nanomaterial (a 2-D nanocarbon) that is distinct from the 0-D fullerene, the 1-D CNT, and the 3-D graphite.

Our research group pioneered the development of graphene materials and related production processes as early as 2002: (1) B. Z. Jang and W. C. Huang, "Nano-scaled Graphene Plates," U.S. Pat. No. 7,071,258 (Jul. 4, 2006), application submitted on Oct. 21, 2002; (2) B. Z. Jang, et al. "Process for Producing Nano-scaled Graphene Plates," U.S. patent application Ser. No. 10/858,814 (Jun. 3, 2004) (U.S. Pat. Pub. No. 2005/0271574); and (3) B. Z. Jang, A. Zhamu, and J. Guo, "Process for Producing Nano-scaled Platelets and Nanocomposites," U.S. patent application Ser. No. 11/509,424 (Aug. 25, 2006) (U.S. Pat. Pub. No. 2008/0048152).

Our research group also pioneered the application of graphene materials for battery applications: One of our earlier applications discloses a graphene-based composite composition for use as a lithium ion battery anode [A. Zhamu and B. Z. Jang, "Nanographene Platelet-Based Composite Anode Compositions for Lithium Ion Batteries," U.S. patent application Ser. No. 11/982,672 (Nov. 5, 2007); Now U.S. Pat. No. 7,745,047 (Jun. 29, 2010)]. Disclosed in another patent application of ours is a more specific composition, which is composed of a 3-D network of NGPs and/or other conductive filaments and anode active material particles that are bonded to these NGPs or filaments through a conductive binder [J. Shi, A. Zhamu and B. Z. Jang, "Conductive Nanocomposite-based Electrodes for Lithium Batteries," U.S. patent application Ser. No. 12/156,644 (Jun. 4, 2008) (U.S. Pat. Pub. No. 2009/0305135)]. Yet another application provides a nanographene-reinforced nanocomposite solid particle composition containing NGPs and electrode active material particles, which are both dispersed in a protective matrix (e.g. a carbon matrix) [A. Zhamu, B. Z. Jang, and J. Shi, "Nanographene Reinforced Nanocomposite for Lithium Battery Electrodes," U.S. patent application Ser. No. 12/315,555 (Dec. 4, 2008) (U.S. Pat. Pub. No. 2010/0143798)]. However, it has been challenging to prepare a well-dispersed mixture of graphene and S particles, particularly when the Si particles are in a form of Si nanowires having a diameter from 5 nm to 100 nm and a length from 100 nm to 20 μm.

The present invention goes beyond and above these prior art efforts of using solid graphene sheets or platelets (NGPs) to form a 3-D conductive network to support an anode active material. Specifically, the instant application makes use of a uniform mixture of graphene sheets (derived from a graphene foam) and Si nanowires as an anode active material to provide several other unexpected functions, in addition to forming a 3-D network of electron-conducting pathways.

The invented homogeneous mixtures of graphene sheets and Si nanowires (or the Si nanowires separated from graphene sheets) can be implemented in lithium-ion batteries using current or existing lithium-ion battery production process, equipment, and facility. This is a drop-in technology that does not require any significant change in current process, equipment, or facility. In contrast, the use of a layer of graphene foam-protected Si nanowires would require changing the anode layer fabrication process, equipment and facility that current includes slurry coating and low-temperature drying.

It is an object of the present invention to provide a process for producing such graphene/Si nanowire hybrid material.

SUMMARY OF THE INVENTION

Herein reported is a process for producing a significantly improved anode active material that is composed of Si nanowires and graphene sheets. In certain embodiments of the invention, the process entails growing Si nanowires in or on a graphene foam or porous graphene structure. The graphene structure, having Si nanowires included therein or deposited thereon, is then broken into pieces to form a powder mass of graphene/Si nanowire hybrid material.

In certain embodiments, the invention provides a process for producing a silicon (Si) nanowire/graphene hybrid material as a lithium-ion battery anode active material; the process comprising: (A) preparing a mixture of catalyst metal-coated Si particles, graphene sheets, and an optional blowing agent, wherein the Si particles have a particle diameter from 50 nm to 50 μm and the catalyst metal is in a form of nanoparticles having a diameter from 0.5 nm to 100 nm or a thin coating having a thickness from 0.5 nm to 100 nm deposited on surfaces of the Si particles and optionally on surfaces of graphene sheets, and wherein the Si particles contain pure Si having at least 99.9% by weight of Si element or a Si alloy or mixture having from 70% to 99.9% by weight of Si therein (this mixture in any desirable shape may be in a container or supported on a solid substrate); (B) exposing this mixture, in a container or on a substrate surface, to a high temperature environment, including a temperature from 100° C. to 2,500° C., for a period of time sufficient to induce volatile gas molecules from the graphene sheets or to activate the blowing agent for producing a porous graphene structure or a graphene foam and to enable a catalyst metal-catalyzed growth of multiple Si nanowires emanating from the Si particles as a feed material to form an amount of graphene foam-protected or porous graphene structure-enclosed Si nanowires; wherein the Si nanowires have a diameter from 2 nm to 100 nm, a length from 50 nm to 20 μm, and a length-to-diameter aspect ratio of at least 5 and the Si nanowires are in an amount from 0.5% to 99% by weight based on the total weight of graphene and Si nanowires combined; and (C) operating a mechanical breaking means to produce the Si nanowire/graphene hybrid material in a powder mass form.

Step (A) of preparing the mixture may be conducted by (a) dispersing the catalyst metal-coated Si particles, graphene sheets, and an optional blowing agent in a liquid medium to form a graphene/Si dispersion; and (b) dispensing and depositing the graphene/Si dispersion onto a surface of a supporting substrate or into a cavity of a container to form a wet layer or mass of graphene/Si mixture and partially or completely removing the liquid medium from the wet layer or mass of graphene/Si mixture to form a dried layer or mass of the mixture.

In some embodiments, the process comprises: (a) dispersing catalyst metal-coated Si particles, graphene sheets (preferably also catalyst metal coated), and an optional blowing agent in a liquid medium to form a graphene/Si dispersion, wherein the Si particles have a particle diameter from 50 nm to 50 μm (preferably from 100 nm to 10 μm and further preferably from 200 nm to 5 μm) and the catalyst metal is in a form of nanoparticles having a diameter from 0.5 nm to 100 nm (preferably from 0.5 nm to 10 nm) or a thin coating having a thickness from 0.5 nm to 100 nm (preferably from 0.5 nm to 10 nm) deposited on surfaces of the Si particles and wherein the Si particles contain pure Si having at least 99.9% by weight of Si element or a Si alloy or mixture having from 70% to 99.9% by weight of Si therein; (b) dispensing and depositing the graphene/Si dispersion onto a surface of a supporting substrate (e.g. glass, PET film, or stainless steel sheet) to form a wet layer of graphene/Si mixture and partially or completely removing the liquid medium from the wet layer of graphene/Si mixture to form a dried layer of graphene/Si mixture material; (c) exposing the dried layer of graphene/Si mixture to a high temperature environment, preferably including a temperature from 300° C. to 2,000° C. (more preferably from 400° C. to 1,500° C., and most preferably from 500° C. to 1,200° C.), for a period of time sufficient to induce volatile gas molecules from the graphene sheets or to activate the blowing agent for producing the graphene foam and to enable a catalyst metal-catalyzed growth of multiple Si nanowires emanating from Si particles as a feed material in pores of the graphene foam to form a layer of graphene foam-protected Si nanowires; wherein the Si nanowires have a diameter from 5 nm to 100 nm (more typically from 10 nm to 50 nm) and a length-to-diameter aspect ratio of at least 5 and the Si nanowires are in an amount from 0.5% to 99% by weight based on the total weight of the graphene foam and the Si nanowires combined. (These Si nanowires appear to have extruded out from the starting Si particles and emanate from surfaces of these Si particles); and (d) operating a mechanical breaking means to produce the Si nanowire/graphene hybrid material in a powder mass form.

The mechanical breaking means may be selected from an air jet mill, high-shear mixer/disperser, ultrasonicator, vibratory ball mill, planetary ball mill, high energy mill, basket mill, agitator ball mill, cryogenic ball mill, microball mill, tumbler ball mill, continuous ball mill, stirred ball mill, pressurized ball mill, attritor, plasma-assisted ball mill, freezer mill, vibratory sieve, bead mill, nanobead mill, ultrasonic homogenizer mill, centrifugal planetary mixer, vacuum ball mill, or resonant acoustic mixer.

After this mechanical breaking operation, the resulting product is typically a powder mass containing a uniform mixture of Si nanowires and graphene sheets. The process may further include a step of separating Si nanowires from graphene sheets. Such a separation step can be readily conducted using a well-known procedure or equipment, such as a powder classifier (e.g. cyclone), mechanical shaking or screening, gravitation-driven differential sedimentation, or any density difference-based separation.

In some embodiments, an air jet mill, high-shear mixer/disperser, ultrasonicator, vibratory ball mill, planetary ball mill, high energy mill, basket mill, agitator ball mill, cryogenic ball mill, microball mill, tumbler ball mill, continuous ball mill, stirred ball mill, pressurized ball mill, attritor, plasma-assisted ball mill, freezer mill, vibratory sieve, bead mill, nanobead mill, ultrasonic homogenizer mill, centrifugal planetary mixer, vacuum ball mill, or resonant acoustic mixer is operated with an intensity and a length of time to reduce said Si nanowires to a length from 20 nm to 1 μm, preferably from 20 nm to 500 nm, and most preferably from 20 nm to 200 nm.

In certain embodiments, the graphene sheets contain a pristine graphene material having less than 0.01% by weight of non-carbon elements or a non-pristine graphene material having 0.01% to 50% by weight of non-carbon elements, wherein the non-pristine graphene is selected from graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof.

In some preferred embodiments, the surfaces of graphene sheets are also deposited with the catalyst metal. We have surprisingly observed that, as compared to the situation where only Si particle surfaces are coated with catalyst metal, larger numbers of smaller-diameter Si nanowires are formed if not only Si particles but also graphene sheet surfaces are deposited with the catalyst metal. These Si nanowires appear to have extruded out from the starting Si particles and emanate from surfaces of graphene sheets as well. The Si nanowires emanated from graphene sheet surfaces (pore wall surfaces inside graphene foam) appear to be very thin (typically from 5 nm to 50 nm, but more typically from 10 nm to 30 nm in diameter) and very long (typically from 50 nm to 20 µm and more typically from 500 nm to 10 µm). We have further found that thinner Si nanowires enable faster transport of lithium ions in and out of the Si nanowires, leading to higher-rate capability (higher power density) of the lithium-ion batteries.

In the process, the dispensing and depositing procedure may include subjecting the graphene/silicon dispersion to an orientation-inducing stress. This is essential to achieving graphene foam of higher conductivity.

The graphene sheets may be selected from a single-layer sheet or few-layer platelet of pristine graphene, graphene oxide, reduced graphene oxide, graphene fluoride, graphene bromide, graphene iodide, boron-doped graphene, nitrogen-doped graphene, chemically functionalized graphene, or a combination thereof, wherein few layer is defined as less than 10 layers of graphene planes.

The catalyst metal-coated Si particles may be produced by a step of depositing a catalyst metal on Si particle surfaces by a procedure of physical vapor deposition, chemical vapor deposition, sputtering, plasma deposition, laser ablation, plasma spraying, ultrasonic spraying, printing, electrochemical deposition, electrode plating, electrodeless plating, chemical plating, or a combination thereof. The catalyst metal may be selected from Cu, Ni, Co, Mn, Fe, Ti, Al, Ag, Au, Pt, Pd, or a combination thereof. It may be noted that the high temperature range required of Si nanowire growth depends on the catalytic metal used. For instance, for Cu, Ni, and/or Fe, the range is preferably from 700° C. to 1,000° C. For the catalysts containing noble metals, the reaction temperatures are preferably and typically higher.

The catalyst metal may be deposited on Si and graphene sheet surfaces by a procedure including (a) dissolving or dispersing a catalytic metal precursor in a liquid to form a precursor solution, (b) bringing the precursor solution in contact with surfaces of the graphene sheets and surfaces of Si particles, (c) removing the liquid; and (d) chemically or thermally converting the catalytic metal precursor to become catalyst metal coating or nanoparticles.

In the invented process, step (d) of chemically or thermally converting the catalytic metal precursor may be conducted concurrently with the procedure (c) of exposing the dried layer of graphene/Si mixture to a high temperature environment. The process catalytic metal precursor may be a salt or organo-metal molecule of a transition metal selected from Cu, Ni, Co, Mn, Fe, Ti, Al, or a combination thereof. Preferably, the catalytic metal precursor is selected from copper nitrate, nickel nitrate, cobalt nitrate, manganese nitrate, iron nitrate, titanium nitrate, aluminum nitrate, copper acetate, nickel acetate, cobalt acetate, manganese acetate, iron acetate, titanium acetate, aluminum acetate, copper sulfate, nickel sulfate, cobalt sulfate, manganese sulfate, iron sulfate, titanium sulfate, aluminum sulfate, copper phosphate, nickel phosphate, cobalt phosphate, manganese phosphate, iron phosphate, titanium phosphate, aluminum phosphate, copper hydroxide, nickel hydroxide, cobalt hydroxide, manganese hydroxide, iron hydroxide, titanium hydroxide, aluminum hydroxide, copper carboxylate, nickel carboxylate, cobalt carboxylate, manganese carboxylate, iron carboxylate, titanium carboxylate, aluminum carboxylate, or a combination thereof.

The invention also provides a process for producing a silicon (Si) nanowire/graphene hybrid material as a lithium-ion battery anode active material; the process comprising: (A) preparing a precursor mixture of multiple Si particles, graphene sheets, a catalytic metal precursor, and an optional blowing agent, wherein said Si particles have a diameter from 50 nm to 50 µm and contain pure Si having at least 99.9% by weight of Si element or a Si alloy or mixture having from 70% to 99.9% by weight of Si therein; (B) exposing the precursor mixture to a high temperature environment, from 100° C. to 2,500° C., for a period of time sufficient to thermally convert said catalytic metal precursor to a coating or nanoparticles of a catalyst metal deposited on surfaces of Si particles and/or surfaces of graphene sheets, to induce volatile gas molecules from the graphene sheets or to activate the blowing agent for producing a graphene foam or a porous graphene structure, and to enable a catalyst metal-catalyzed growth of multiple Si nanowires emanating from the Si particles as a feed material to form an amount of graphene foam-protected or porous graphene structure-enclosed Si nanowires; wherein the Si nanowires have a diameter from 5 nm to 100 nm, a length from 50 nm to 20 µm, and a length-to-diameter aspect ratio of at least 5, and the Si nanowires are in an amount from 0.5% to 95% by weight based on the total weight of the graphene and Si nanowires combined; and (C) operating a mechanical breaking means to produce the Si nanowire/graphene hybrid material in a powder mass form.

In the invented process, Step (A) of preparing the precursor mixture is conducted by (a) dispersing the Si particles, graphene sheets, catalytic metal precursor, and optional blowing agent in a liquid to form a precursor dispersion; and (b) dispensing and depositing the precursor dispersion onto a surface of a supporting substrate to form a wet layer of precursor mixture and partially or completely removing the liquid medium from the wet layer of precursor mixture to form a dried layer of precursor mixture, containing the Si particles, graphene sheets, catalytic metal precursor, and optional blowing agent that are well-dispersed together.

In certain embodiments, the process comprises: (A) dispersing multiple Si particles, graphene sheets, a catalytic metal precursor, and an optional blowing agent in a liquid to form a graphene/Si dispersion, wherein the Si particles have a diameter from 50 nm to 50 µm and contain pure Si having at least 99.9% by weight of Si element or a Si alloy or mixture having from 70% to 99.9% by weight of Si therein; (B) dispensing and depositing the graphene/Si dispersion onto a surface of a supporting substrate to form a wet layer of graphene/Si mixture and partially or completely removing the liquid medium from the wet layer of graphene/Si mixture to form a dried layer of graphene/Si mixture material; (C) exposing the dried layer of graphene/Si mixture to a high temperature environment, from 100° C. to 2,500° C., for a period of time sufficient to thermally convert the catalytic metal precursor to a coating or nanoparticles of a catalyst metal deposited on surfaces of Si particles and/or surfaces of graphene sheets, to induce volatile gas molecules from the graphene sheets or to activate the blowing agent for producing the graphene foam, and, concurrently or sequentially, to enable a catalyst metal-catalyzed growth of multiple Si nanowires emanating from the Si particles as a feed material in pores of the graphene foam to form a layer of Si nanowire/graphene hybrid material; wherein the Si nanowires have a diameter less than 100 nm (typically from 5 nm to 100 nm), a length from 100 nm to 20 μm, and a length-to-diameter aspect ratio of at least 5 (typically up to 2,000) and the Si nanowires are in an amount from 0.5% to 99% by weight based on the total weight of the graphene foam and the Si nanowires combined; and (D) operating a mechanical breaking means to produce the Si nanowire/graphene hybrid material in a powder mass form.

In certain embodiments, the mechanical breaking means is selected from an air jet mill, high-shear mixer/disperser, ultrasonicator, vibratory ball mill, planetary ball mill, high energy mill, basket mill, agitator ball mill, cryogenic ball mill, microball mill, tumbler ball mill, continuous ball mill, stirred ball mill, pressurized ball mill, attritor, plasma-assisted ball mill, freezer mill, vibratory sieve, bead mill, nanobead mill, ultrasonic homogenizer mill, centrifugal planetary mixer, vacuum ball mill, or resonant acoustic mixer.

In certain embodiments, the catalytic metal precursor is a salt or organo-metal molecule of a transition metal selected from Cu, Ni, Co, Mn, Fe, Ti, Al, or a combination thereof. The catalytic metal precursor may be selected from copper nitrate, nickel nitrate, cobalt nitrate, manganese nitrate, iron nitrate, titanium nitrate, aluminum nitrate, copper acetate, nickel acetate, cobalt acetate, manganese acetate, iron acetate, titanium acetate, aluminum acetate, copper sulfate, nickel sulfate, cobalt sulfate, manganese sulfate, iron sulfate, titanium sulfate, aluminum sulfate, copper phosphate, nickel phosphate, cobalt phosphate, manganese phosphate, iron phosphate, titanium phosphate, aluminum phosphate, copper hydroxide, nickel hydroxide, cobalt hydroxide, manganese hydroxide, iron hydroxide, titanium hydroxide, aluminum hydroxide, copper carboxylate, nickel carboxylate, cobalt carboxylate, manganese carboxylate, iron carboxylate, titanium carboxylate, aluminum carboxylate, or a combination thereof.

Preferably, the procedure of exposing the mixture (containing catalyst metal-coated Si particles, graphene sheets, and an optional blowing agent) or precursor mixture (e.g. containing multiple Si particles, graphene sheets, a catalytic metal precursor, and an optional blowing agent) to a high temperature environment is conducted in a protective atmosphere of an inert gas, nitrogen gas, hydrogen gas, a mixture thereof, or in a vacuum.

In certain embodiments, the starting Si particles have a diameter or thickness from 50 nm to 50 μm, including the range from 50 nm to 0.2 μm, from 0.2 μm to 2 μm, and from 2 μm to 50 μm. There is no theoretical limitation on the size of the starting Si particles; the diameter can be several centimeters (e.g. 10 cm), but preferably no greater than 1 mm and more preferably no greater than 100 μm.

The Si nanowires produced using the invented process typically have a diameter from 5 nm to 50 nm and a length from 50 nm to 30 μm (more typically from 100 nm to 20 μm and most typically from 200 nm to 10 μm). As shown in FIG. 4(C) and FIG. 4(D), most of the Si nanowires in the invented hybrid powder mass are curly in shape and have a radius of curvature from 100 nm to 10 μm and more typically from 200 nm to 2 μm.

The invented process may further comprise a step of separating Si nanowires from the graphene sheets after the mechanical breaking step.

In some embodiments, during and/or after the mechanical breaking step, an air jet mill, high-shear mixer/disperser, ultrasonicator, vibratory ball mill, planetary ball mill, high energy mill, basket mill, agitator ball mill, cryogenic ball mill, microball mill, tumbler ball mill, continuous ball mill, stirred ball mill, pressurized ball mill, attritor, plasma-assisted ball mill, freezer mill, vibratory sieve, bead mill, nanobead mill, ultrasonic homogenizer mill, centrifugal planetary mixer, vacuum ball mill, or resonant acoustic mixer is operated with an intensity and a length of time to reduce the Si nanowires to a length from 20 nm to 1 μm.

The process may further comprise a step of mixing the produced Si nanowire/graphene hybrid material with a binder resin and an optional conductive additive to make an anode electrode, which is optionally deposited on a surface of a current collector.

The process may further comprise a step of combining the anode electrode containing the invented graphene/Si nanowire hybrid material, a cathode electrode, and an electrolyte to form a lithium-ion battery.

In a preferred embodiment, the layer of solid graphene foam-protected Si nanowires is made into a continuous-length roll sheet form (a roll of a continuous foam sheet) having a thickness from 1 μm to 200 mm and a length of at least 1 meter long, preferably at least 2 meters, further preferably at least 10 meters, and most preferably at least 100 meters. This sheet roll is produced by a roll-to-roll process. Such a roll-to-roll process may begin with the preparation of a the wet layer in a continuous-length roll sheet form, which is then dried to become a dry layer in a continuous-length roll sheet form and het-treated to become a layer of graphene foam-protected Si nanowires in a continuous-length roll sheet form.

The optional blowing agent used in the invented process is not required if the graphene material has a content of non-carbon elements (e.g. O, H, N, B, F, Cl, Br, I, etc.) no less than 5% by weight (preferably no less than 10%, further preferably no less than 20%, even more preferably no less than 30% or 40%, and most preferably up to 50%). The subsequent high temperature treatment serves to remove a majority of these non-carbon elements from the graphene material, generating volatile gas species that produce pores or cells in the solid graphene material structure. In other words, quite surprisingly, these non-carbon elements play the role of a blowing agent. Hence, an externally added blowing agent is optional (not required). However, the use of a blowing agent can provide added flexibility in regulating or adjusting the porosity level and pore sizes for a desired application. The blowing agent is typically required if the non-carbon element content is less than 5%, such as pristine graphene that is essentially all-carbon.

The blowing agent can be a physical blowing agent, a chemical blowing agent, a mixture thereof, a dissolution-and-leaching agent, or a mechanically introduced blowing agent.

If the original graphene material in the dispersion contains a fraction of non-carbon elements higher than 5% by weight, the graphene material in the solid graphene foam (after the heat treatment) contains structural defects that are induced during the step (d) of heat treating. The liquid medium can be simply water and/or an alcohol, which is environmentally benign.

In a preferred embodiment, the process is a roll-to-roll process wherein steps (b) and (c) include feeding the supporting substrate from a feeder roller to a deposition zone, continuously or intermittently depositing the graphene dispersion onto a surface of the supporting substrate to form the wet layer thereon, drying the wet layer to form the dried layer of material mixture, and collecting the dried layer of material mixture deposited on the supporting substrate on a collector roller. Such a roll-to-roll or reel-to-reel process is a truly industrial-scale, massive manufacturing process that can be automated.

In one embodiment, the heat treatment temperature is from 100° C. to 2,500° C. In a specific embodiment, the heat treatment temperature includes a temperature in the range from 300-1,500° C. for a period from 1 minute to 5 hours.

There are several surprising results of conducting heat treatments on the dried graphene-Si mixture layer, and different heat treatment temperature ranges enable us to achieve different purposes (in addition to the promoted growth of Si nanowires), such as (a) removal of non-carbon elements from the graphene material (e.g. thermal reduction of fluorinated graphene to obtain graphene or reduced graphene fluoride, RGF)) which generate volatile gases to produce pores or cells in a graphene material, (b) activation of the chemical or physical blowing agent to produce pores or cells, (c) chemical merging or linking of graphene sheets to significantly increase the lateral dimension of graphene sheets in the foam walls (solid portion of the foam), (d) healing of defects created during fluorination, oxidation, or nitrogenation of graphene planes in a graphite particle, and (e) re-organization and perfection of graphitic domains or graphite crystals. These different purposes or functions are achieved to different extents within different temperature ranges. The non-carbon elements typically include an element selected from oxygen, fluorine, chlorine, bromine, iodine, nitrogen, hydrogen, or boron. Quite surprisingly, even under low-temperature foaming conditions, heat-treating induces chemical linking, merging, or chemical bonding between graphene sheets, often in an edge-to-edge manner (some in face-to-face manner).

In an embodiment, the graphene dispersion has at least 3% by weight of graphene oxide dispersed in the liquid medium to form a liquid crystal phase. In another embodiment, the graphene dispersion contains a graphene oxide dispersion prepared by immersing a graphitic material in a powder or fibrous form in an oxidizing liquid in a reaction vessel at a reaction temperature for a length of time sufficient to obtain the graphene dispersion wherein the graphitic material is selected from natural graphite, artificial graphite, mesophase carbon, mesophase pitch, mesocarbon microbead, soft carbon, hard carbon, coke, carbon fiber, carbon nanofiber, carbon nanotube, or a combination thereof and wherein the graphene oxide has an oxygen content no less than 5% by weight.

After the powder mass of the graphene/Si nanowire hybrid material is made by any of the processes discussed above, the hybrid material may be made into secondary particles (or particulates. Any of the processes discussed above may further comprise a step of dispersing the Si nanowire/graphene hybrid material and an optional organic or polymeric material in a liquid medium to obtain a suspension and then converting the suspension into multiple secondary particles or particulates, wherein at least one of the particulates comprises a core and a shell embracing the core wherein the core comprises a single or a plurality of graphene sheets and a plurality of Si nanowires and the graphene sheets and the Si nanowires are mutually bonded or agglomerated into the core and the shell comprises one or a plurality of graphene sheets.

The step of converting the suspension into multiple secondary particles or particulates may comprise a procedure selected from spray-drying, spray-pyrolysis, fluidized-bed drying, atomization, or aerosolizing.

The process may further comprise a step of thermally converting the organic or polymeric material into a carbon material which is in electronic contact with the Si nanowires and/or the graphene sheets.

In this process, the suspension may further contain a conductive material selected from a conducting polymer, carbon nanotube, carbon nanofiber, carbon black, coke, acetylene black, activated carbon, expanded graphite flake, artificial graphite particle, natural graphite particle, or a combination thereof and the core further contains this conductive material.

The present invention also provides a powder mass of a graphene/Si nanowire hybrid material for a lithium-ion battery anode active material, the powder mass comprising multiple Si nanowires inter-mixed with multiple graphene sheets wherein the Si nanowires have a diameter from 2 nm to 50 nm and a length from 50 nm to 20 μm, and the Si nanowires are in an amount from 0.5% to 99% by weight based on the total weight of said graphene sheets and said Si nanowires combined. Preferably, in the powder mass, the Si nanowires have a diameter from 10 nm to 40 nm and a length from 100 nm to 10 μm. The Si nanowires are curly in shape and have a radius of curvature from 100 nm to 10 μm and more typically from 200 nm to 2 μm.

In the powder mass, the graphene sheets may contain a pristine graphene material having less than 0.01% by weight of non-carbon elements or a non-pristine graphene material having 0.01% to 50% by weight of non-carbon elements, wherein said non-pristine graphene is selected from graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof.

The graphene sheets may be selected from a single-layer sheet or few-layer platelet of pristine graphene, graphene oxide, reduced graphene oxide, graphene fluoride, graphene bromide, graphene iodide, boron-doped graphene, nitrogen-doped graphene, chemically functionalized graphene, or a combination thereof, wherein few layer is defined as less than 10 layers of graphene planes.

In certain preferred embodiments, the powder mass comprises multiple secondary particles or particulates and at least one of the particulates comprises a core and a shell embracing the core, wherein the core comprises a single or a plurality of graphene sheets and a plurality of Si nanowires and the graphene sheets and the Si nanowires are mutually bonded or agglomerated into the core and the shell comprises one or a plurality of graphene sheets.

The core may further comprise contains a conductive material selected from a carbon material (e.g. polymeric carbon or carbonized resin), conducting polymer, carbon nanotube, carbon nanofiber, carbon black, coke, acetylene black, activated carbon, expanded graphite flake, artificial graphite particle, natural graphite particle, or a combination thereof.

The invention also provides an anode comprising the invented powder mass as an anode active material, an optional conductive additive, and a resin binder. The invention further provides a lithium-ion battery comprising this anode, a cathode, and an electrolyte.

In certain embodiments, the present invention also provides a lithium battery containing the aforementioned graphene/Si nanowire hybrid material in the anode layer, a cathode or positive electrode, and an electrolyte in ionic contact with the anode and the cathode. In certain embodiments, the lithium battery further contains a cathode current collector in electronic contact with the cathode. In some embodiments, the lithium battery further contains an anode current collector in electronic contact with the anode layer.

The invention also provides a new class of material—curly Si nanowires. These Si nanowires have a diameter from 2 nm to 100 nm (mostly from 5 nm to 50 nm) and a length from 50 nm to 30 µm (mostly from 100 nm to 20 µm). The Si nanowires are curly in shape and have a radius of curvature from 100 nm to 10 µm and more typically from 200 nm to 2 µm.

DESCRIPTION OF THE PREFERRED EMBODIMENTS

This invention is directed at an anode active material containing graphene-supported Si nanowires for a lithium-ion battery, preferably based on a non-aqueous electrolyte (e.g. lithium salt dissolved in an organic solvent), a polymer gel electrolyte, an ionic liquid electrolyte, a quasi-solid electrolyte, or a solid-state electrolyte. The shape of a lithium secondary battery can be cylindrical, square, button-like, etc. The present invention is not limited to any battery shape or configuration. The Si nanowires are mostly chemically bonded to graphene surfaces at one of the two ends of each Si nanowire.

Figure 3A:
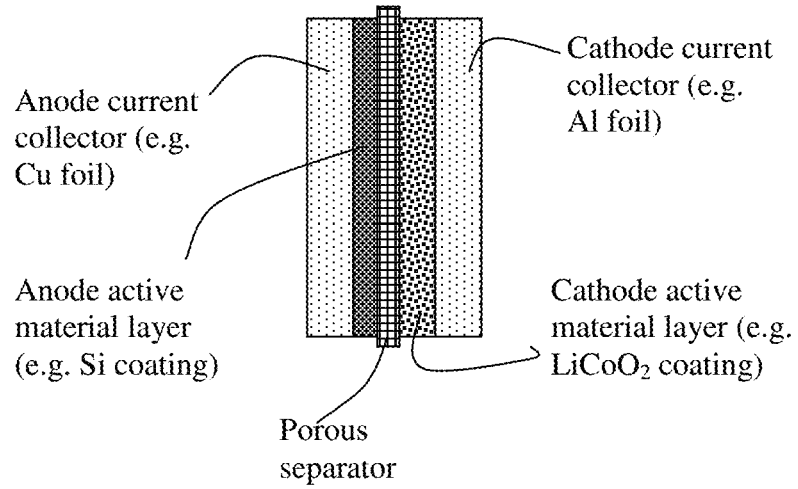
FIG. 3(A) Schematic of a prior art lithium-ion battery cell, wherein the anode layer is a thin coating of an anode active material itself (e.g. Si coating)
Figure 3B:
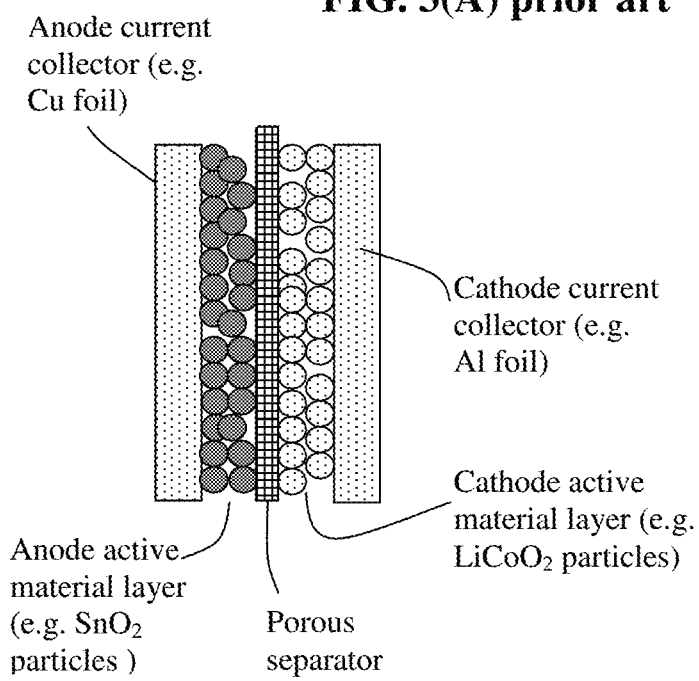
FIG. 3(B) Schematic of another lithium-ion battery; the anode layer being composed of particles of an anode active material, a conductive additive (not shown) and a resin binder (not shown).

As illustrated in FIG. 3(A) and FIG. 3(B), a lithium-ion battery cell is typically composed of an anode current collector (e.g. Cu foil), an anode or negative electrode (anode layer typically containing an anode active material, a conductive additive, and a resin binder), a porous separator and/or an electrolyte component, a cathode electrode (typically containing a cathode active material, a conductive additive, and a resin binder), and a cathode current collector (e.g. Al foil).

In a more commonly used cell configuration (FIG. 3(B)), the anode layer is composed of particles of an anode active material (e.g. graphite, Sn, $SnO_2$, or Si), a conductive additive (e.g. carbon black particles), and a resin binder (e.g. SBR or PVDF).

In a less commonly used cell configuration, as illustrated in FIG. 3(A), the anode active material is in a thin film form deposited directly onto an anode current collector, such as a sheet of copper foil. However, such a thin film structure with an extremely small thickness-direction dimension (typically much smaller than 500 nm, often necessarily thinner than 100 nm) implies that only a small amount of active material can be incorporated in an electrode (given the same electrode or current collector surface area), providing a low total lithium storage capacity and low lithium storage capacity per unit electrode surface area.

In certain embodiments, the invention provides a process for producing a silicon (Si) nanowire/graphene hybrid material as a lithium-ion battery anode active material; the process comprising: (A) preparing a mixture of catalyst metal-coated Si particles, graphene sheets, and an optional blowing agent, wherein the Si particles have a particle diameter from 50 nm to 50 µm and the catalyst metal is in a form of nanoparticles having a diameter from 0.5 nm to 100 nm or a thin coating having a thickness from 0.5 nm to 100 nm deposited on surfaces of the Si particles and optionally on surfaces of graphene sheets, and wherein the Si particles contain pure Si having at least 99.9% by weight of Si element or a Si alloy or mixture having from 70% to 99.9% by weight of Si therein (this mixture in any desirable shape may be in a container or supported on a solid substrate); (B) exposing this mixture, in a container or on a substrate surface, to a high temperature environment, including a temperature from 100° C. to 2,500° C., for a period of time sufficient to induce volatile gas molecules from the graphene sheets or to activate the blowing agent for producing a porous graphene structure or a graphene foam and to enable a catalyst metal-catalyzed growth of multiple Si nanowires emanating from the Si particles as a feed material to form an amount of graphene foam-protected or porous graphene structure-enclosed Si nanowires (as schematically illustrated in FIG. 2 as an example); wherein the Si nanowires have a diameter from 2 nm to 100 nm, a length from 50 nm to 20 μm, and a length-to-diameter aspect ratio of at least 5 and the Si nanowires are in an amount from 0.5% to 99% by weight based on the total weight of graphene and Si nanowires combined; and (C) operating a mechanical breaking means to produce the Si nanowire/graphene hybrid material in a powder mass form.

Figure 1:
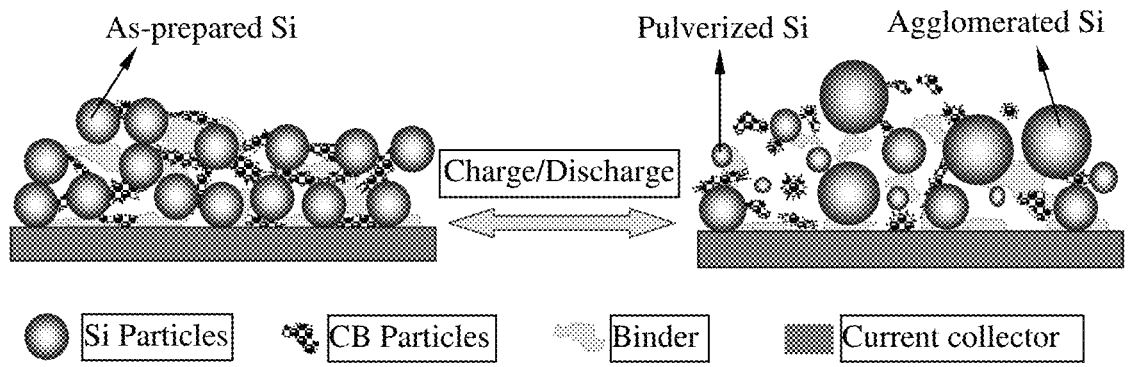
FIG. 1 Schematic illustrating the notion that, in a prior art anode, expansion of Si particles, upon lithium intercalation, can lead to pulverization of Si particles, interruption of the conductive paths formed by the conductive additive, and loss of contact with the current collector.
Figure 2:
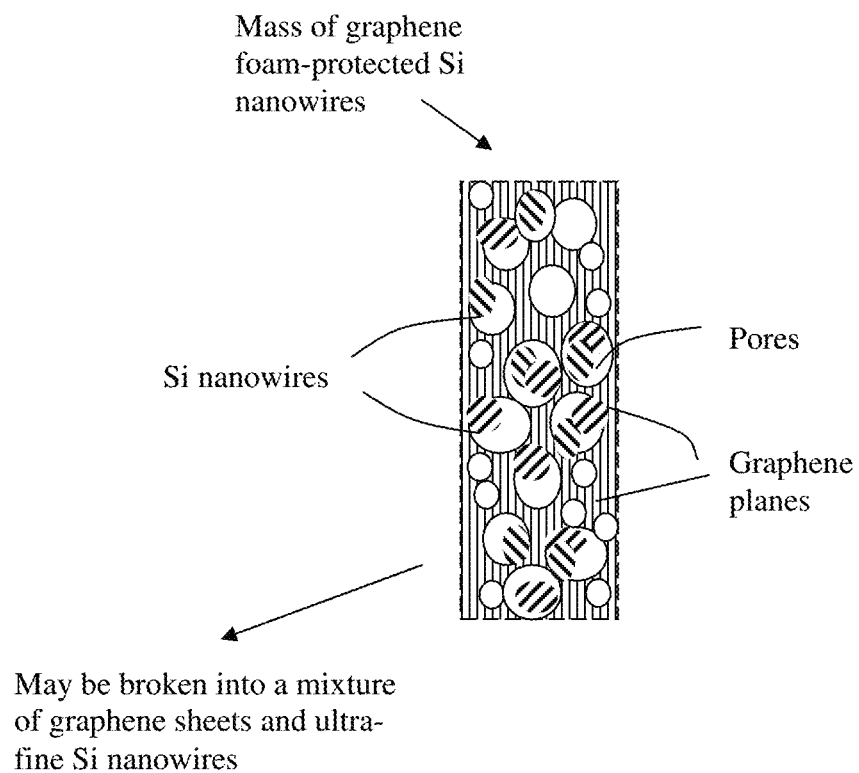
FIG. 2 Schematic of a mass of graphene foam-protected Si nanowires, which may be mechanically broken to obtain a powder mass of a graphene/Si nanowire hybrid material.

More specifically, as illustrated in FIG. 2, prior to the step of mechanical breaking, the graphene foam or porous graphene structure comprises an anode active material (Si nanowires) embedded in pores of a solid graphene foam, which is composed of multiple pores and pore walls (solid portion of the graphene foam), wherein (a) the pore walls contain a pristine graphene material having essentially zero % of non-carbon elements or a non-pristine graphene material having 0.001% to 5% by weight of non-carbon elements, wherein the non-pristine graphene is selected from graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof; and (b) the Si nanowires are in an amount from 0.5% to 99% by weight (preferably from 2% to 90% by weight and more preferably from 5% to 80% by weight) based on the total weight of the graphene and the Si nanowires combined.

Briefly, in certain embodiments, the process for producing the un-broken graphene foam comprises the following steps:

(a) Preparing a graphene dispersion having catalyst metal-coated Si particles and sheets of a graphene material (with or without catalyst metal deposited on graphene sheet surfaces) dispersed in a liquid medium, wherein the graphene material is selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof and wherein the dispersion contains an optional blowing agent with a blowing agent-to-graphene material weight ratio from 0/1.0 to 1.0/1.0 (this blowing agent may be needed if the graphene material is pristine graphene, typically having a blowing agent-to-pristine graphene weight ratio from 0.01/1.0 to 1.0/1.0).

(b) Dispensing and depositing the graphene dispersion onto a surface of a supporting substrate (e.g. plastic film, rubber sheet, metal foil, glass sheet, paper sheet, etc.) to form a wet layer of graphene-Si mixture, wherein the dispensing and depositing procedure (e.g. coating or casting) preferably includes subjecting the graphene dispersion to an orientation-inducing stress. This is followed by partially or completely removing the liquid medium from the wet layer of graphene material to form a dried layer of material mixture, with the graphene material having a content of non-carbon elements (e.g. O, H, N, B, F, Cl, Br, I, etc.) no less than 5% by weight (this non-carbon content, when being removed via heat-induced decomposition, produces volatile gases that act as a foaming agent or blowing agent); and (c) Exposing the catalyst metal-coated mixture mass to a high temperature environment (preferably from 300° C. to 2,500° C., more preferably from 400° C. to 1,500° C., and most preferably from 500° C. to 1,200° C.) for a period of time sufficient to enable a catalytic metal-catalyzed growth of multiple silicon nanowires using the silicon particles as a feed material to form an amount of graphene foam-protected Si nanowires. These Si nanowires appear to have extruded out from the starting Si particles and emanate from surfaces of graphene sheets (if graphene sheet surfaces are also deposited with the catalyst metal). The silicon nanowires produced in this manner have a diameter from 2 nm to 100 nm (typically <20 nm if further emanated from graphene pore wall surfaces) and a length-to-diameter aspect ratio of at least 5 (more typically l/d=10-10,000 and most typically 100-1,000). The heat exposure also induces volatile gas molecules from the non-carbon elements in the graphene material or to activate the blowing agent for producing the solid graphene foam. The resulting graphene foam, when measured without Si, typically has a density from 0.01 to 1.7 g/cm$^3$ (more typically from 0.1 to 1.5 g/cm$^3$, and even more typically from 0.1 to 1.0 g/cm$^3$, and most typically from 0.2 to 0.75 g/cm$^3$), or a specific surface area from 50 to 3,000 m$^2$/g (more typically from 200 to 2,000 m$^2$/g, and most typically from 500 to 1,500 m$^2$/g).

Figure 4A:
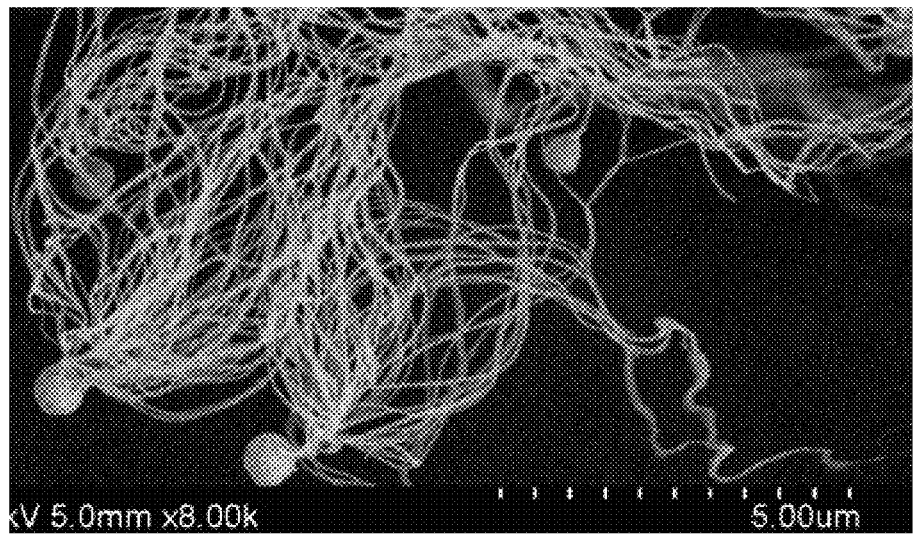
FIG. 4(A) SEM image showing Si nanowires grown out of previously larger-diameter Si particles (originally 3-5 µm); these Si nanowires grow by feeding on these Si particles which become smaller or even disappear (being totally consumed).
Figure 4B:
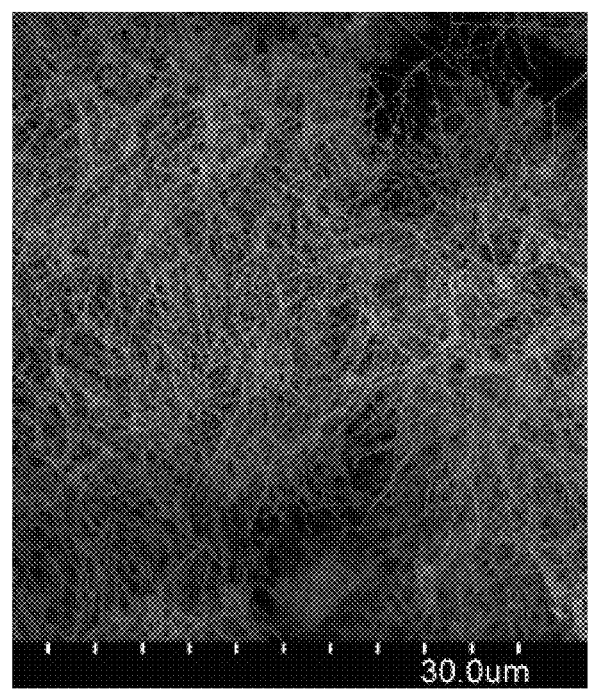
FIG. 4(B) SEM image showing Si nanowires emanated from graphene surfaces; these Si nanowires being much smaller in diameter as compared to those directly grown from Si micron particles without the presence of catalyst metal-coated graphene sheets.

The present invention provides a process for initiating and growing Si nanowires from micron or sub-micron scaled silicon particles having a particle diameter from 50 nm to 50 μm (although not desired, can be centimeters in diameter). In other words, the starting material is micron or sub-micron scaled silicon particles, which are thermally and catalytically converted directly into nanoscaled, wire-shaped Si having a diameter or thickness from 2 nm to 100 nm, more typically less than 50 nm and most typically less than 30 nm (often as small as 2-10 nm). Studies using scanning electron microscopy (SEM) indicate that tens or hundreds of nanowires can be grown or "extruded out" from a starting solid Si particle. As an example, FIG. 4(A) shows that hundreds of Si nanowires have been sprouted or emanated from just a few Si particles that were originally 3-5 μm in diameter. These Si nanowires have drawn the needed Si atoms from the few starting Si particles. By "spitting" out such a large number of nanowires, the original Si particles (without the help from graphene sheets) were reduced to approximately 0.6 μm in diameter. When being surrounded by catalyst metal-deposited graphene pore walls, essentially all the micron or sub-micron Si particles are totally "eaten up"; there is typically no residual Si particles left (e.g. FIG. 4(B)).

The catalytic metal deposited on Si particle or graphene sheet surfaces is preferably in the form of a nanoscaled coating (having a thickness less than 100 nm, preferably less than 10 nm, more preferably less than 5 nm, and most preferably less than 1 nm) or nanoscaled particles (having a diameter less than 100 nm, preferably less than 10 nm, more preferably less than 5 nm, and most preferably less than 1 nm). Thinner metal coating or smaller particles of metal are more effective in producing a larger number of smaller Si nanowires, which are preferred features when it comes to using Si nanowires as an anode active material of a lithium-ion battery.

Figure 4C:
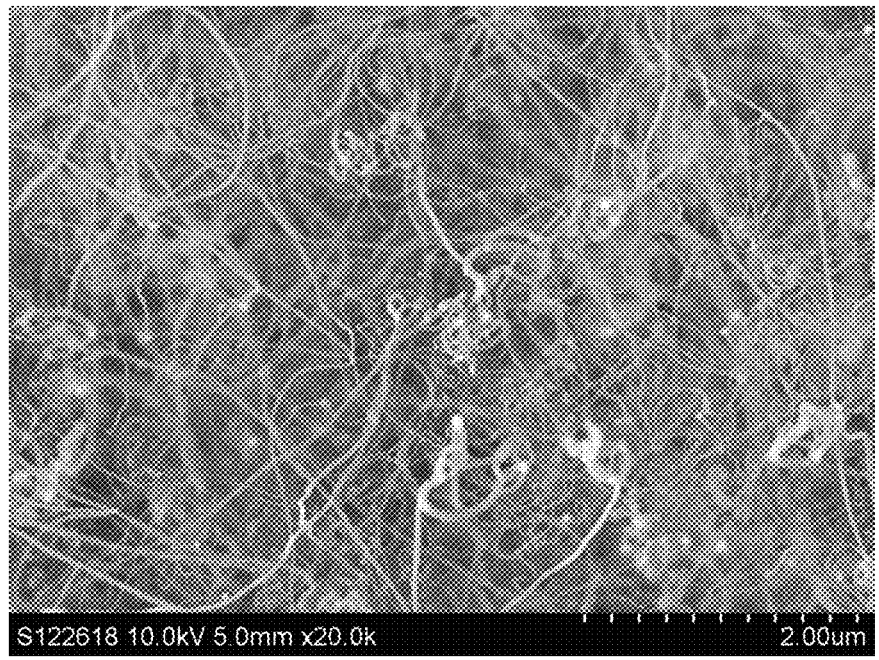
FIG. 4(C) SEM image showing Si nanowire-graphene hybrid powder mass; many curly Si nanowires are clearly visible.
Figure 4D:
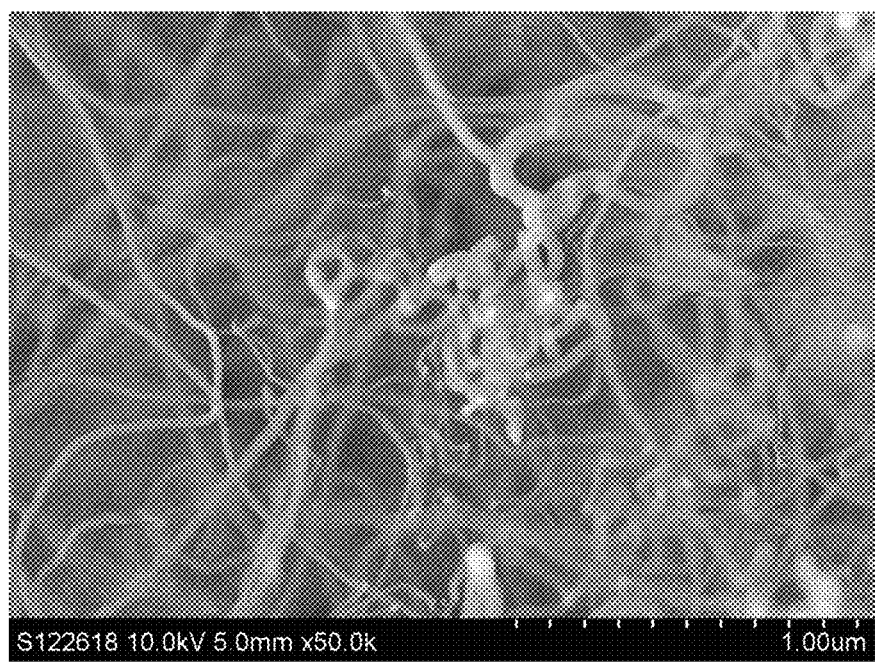
FIG. 4(D) Another SEM image showing the curly Si nanowires in the hybrid powder mass.

The Si nanowires produced using the invented process more typically have a diameter from 5 nm to 50 nm and a length from 50 nm to 30 μm (more typically from 100 nm to 20 μm and most typically from 200 nm to 10 μm). As shown in FIG. 4(C) and FIG. 4(D), most of the Si nanowires in the invented hybrid powder mass are curly in shape and have a radius of curvature from 100 nm to 10 μm and more typically from 200 nm to 2 μm. This curly shape naturally enables the presence of certain amount of empty space between Si nanowires that can accommodate the volume expansion of Si when the lithium-ion battery is charged. Our data have surprisingly shown that this feature leads to a significantly longer battery cycle life.

There are at least three sequences to follow for the deposition of catalyst metal coating or particles on Si particle surfaces and/or graphene sheet surfaces. The first possible sequence involves depositing surfaces of micron- or sub-micron-sized Si particles with catalyst metal (e.g. Ni) before these Si particles are dispersed in graphene suspension. The second possible sequence involves depositing catalyst metal onto both surfaces of Si particles and surfaces of graphene sheets before these Si particles and the graphene sheets are dispersed in a liquid medium to form a graphene dispersion. The third possible sequence entails dispersing Si particles (un-coated with catalyst metal) and graphene sheets (un-coated with catalyst metal) into a liquid medium, which also contains a catalyst metal precursor dissolved therein. After the dispersion is dispensed and deposited to form a layer and during a subsequent heat treatment, the precursor is thermally converted to catalyst metal coating or nanoparticles which naturally deposits onto surfaces of Si particles and pore walls (surfaces of graphene planes) of the resulting graphene foam.

In the first two possible sequences, the catalyst metal-coated Si particles may be produced by a step of depositing a catalyst metal on Si particle surfaces using a procedure of physical vapor deposition, chemical vapor deposition, sputtering, plasma deposition, laser ablation, plasma spraying, ultrasonic spraying, printing, electrochemical deposition, electrode plating, electrodeless plating, chemical plating, or a combination thereof. The catalyst metal may be selected from Cu, Ni, Co, Mn, Fe, Ti, Al, Ag, Au, Pt, Pd, or a combination thereof. It may be noted that the high temperature range required of Si nanowire growth depends on the catalytic metal used. For instance, for Cu, Ni, and/or Fe, the range is preferably from 700° C. to 1,000° C. For the catalysts containing noble metals, the reaction temperatures are preferably and typically higher.

The catalyst metal may be deposited on Si and graphene sheet surfaces by a procedure including (a) dissolving or dispersing a catalytic metal precursor in a liquid to form a precursor solution, (b) bringing the precursor solution in contact with surfaces of the graphene sheets and surfaces of Si particles, (c) removing the liquid; and (d) chemically or thermally converting the catalytic metal precursor to become catalyst metal coating or nanoparticles.

In the invented process that involves the third possible sequence, step (d) of chemically or thermally converting the catalytic metal precursor may be conducted concurrently with the procedure (c) of exposing the dried layer of graphene/Si mixture to a high temperature environment. The process catalytic metal precursor may be a salt or organometal molecule of a transition metal selected from Cu, Ni, Co, Mn, Fe, Ti, Al, or a combination thereof. Preferably, the catalytic metal precursor is selected from copper nitrate, nickel nitrate, cobalt nitrate, manganese nitrate, iron nitrate, titanium nitrate, aluminum nitrate, copper acetate, nickel acetate, cobalt acetate, manganese acetate, iron acetate, titanium acetate, aluminum acetate, copper sulfate, nickel sulfate, cobalt sulfate, manganese sulfate, iron sulfate, titanium sulfate, aluminum sulfate, copper phosphate, nickel phosphate, cobalt phosphate, manganese phosphate, iron phosphate, titanium phosphate, aluminum phosphate, copper hydroxide, nickel hydroxide, cobalt hydroxide, manganese hydroxide, iron hydroxide, titanium hydroxide, aluminum hydroxide, copper carboxylate, nickel carboxylate, cobalt carboxylate, manganese carboxylate, iron carboxylate, titanium carboxylate, aluminum carboxylate, or a combination thereof.

Thus, in certain embodiments of the invention, the process comprises: (A) dispersing Si particles, graphene sheets, a catalytic metal precursor, and an optional blowing agent in a liquid to form a graphene/Si dispersion, wherein the Si particles have a diameter from 0.2 μm to 20 μm and contain pure Si having at least 99.9% by weight of Si element or a Si alloy or mixture having from 70% to 99.9% by weight of Si therein; (B) dispensing and depositing the graphene/Si dispersion onto a surface of a supporting substrate to form a wet layer of graphene/Si mixture and partially or completely removing the liquid medium from the wet layer of graphene/Si mixture to form a dried layer of graphene/Si mixture material; and (C) exposing said dried layer of graphene/Si mixture to a high temperature environment, from 100° C. to 2,500° C., for a period of time sufficient to thermally convert the catalytic metal precursor to a coating or nanoparticles of a catalyst metal deposited on surfaces of Si particles and/or surfaces of graphene sheets, to induce volatile gas molecules from the graphene sheets or to activate the blowing agent for producing the graphene foam, and, concurrently or sequentially, to enable a catalyst metal-catalyzed growth of multiple Si nanowires emanating from the Si particles as a feed material to form a mass of graphene foam- or porous graphene structure-protected Si nanowires; wherein the Si nanowires have a diameter from 2 nm to 100 nm and a length-to-diameter aspect ratio of at least 5 and the Si nanowires are in an amount from 0.5% to 95% by weight based on the total weight of the graphene and the Si nanowires combined.

A blowing agent or foaming agent is a substance which is capable of producing a cellular or foamed structure via a foaming process in a variety of materials that undergo hardening or phase transition, such as polymers (plastics and rubbers), glass, and metals. They are typically applied when the material being foamed is in a liquid state. It has not been previously known that a blowing agent can be used to create a foamed material while in a solid state. More significantly, it has not been previously taught or hinted that an aggregate of graphene sheets can be converted into a graphene foam via a blowing agent. The cellular structure in a polymer matrix is typically created for the purpose of reducing density, increasing thermal resistance and acoustic insulation, while increasing the thickness and relative stiffness of the original polymer.

Blowing agents or related foaming mechanisms to create pores or cells (bubbles) in a matrix for producing a foamed or cellular material, can be classified into the following groups:
  (a) Physical blowing agents: e.g. hydrocarbons (e.g. pentane, isopentane, cyclopentane), chlorofluorocarbons (CFCs), hydrochlorofluorocarbons (HCFCs), and liquid $CO_2$. The bubble/foam-producing process is endothermic, i.e. it needs heat (e.g. from a melt process or the chemical exotherm due to cross-linking), to volatize a liquid blowing agent.
  (b) Chemical blowing agents: e.g. isocyanate, azo-, hydrazine and other nitrogen-based materials (for thermoplastic and elastomeric foams), sodium bicarbonate (e.g. baking soda, used in thermoplastic foams). Here gaseous products and other by-products are formed by a chemical reaction, promoted by process or a reacting polymer's exothermic heat. Since the blowing reaction involves forming low molecular weight compounds that act as the blowing gas, additional exothermic heat is also released. Powdered titanium hydride is used as a foaming agent in the production of metal foams, as it decomposes to form titanium and hydrogen gas at elevated temperatures. Zirconium (II) hydride is used for the same purpose. Once formed the low molecular weight compounds will never revert to the original blowing agent(s), i.e. the reaction is irreversible.

(c) Mixed physical/chemical blowing agents: e.g. used to produce flexible polyurethane (PU) foams with very low densities. Both the chemical and physical blowing can be used in tandem to balance each other out with respect to thermal energy released/absorbed; hence, minimizing temperature rise. For instance, isocyanate and water (which react to form $CO_2$) are used in combination with liquid $CO_2$ (which boils to give gaseous form) in the production of very low density flexible PU foams for mattresses.

(d) Mechanically injected agents: Mechanically made foams involve methods of introducing bubbles into liquid polymerizable matrices (e.g. an unvulcanized elastomer in the form of a liquid latex). Methods include whisking-in air or other gases or low boiling volatile liquids in low viscosity lattices, or the injection of a gas into an extruder barrel or a die, or into injection molding barrels or nozzles and allowing the shear/mix action of the screw to disperse the gas uniformly to form very fine bubbles or a solution of gas in the melt. When the melt is molded or extruded and the part is at atmospheric pressure, the gas comes out of solution expanding the polymer melt immediately before solidification.

(e) Soluble and leachable agents: Soluble fillers, e.g. solid sodium chloride crystals mixed into a liquid urethane system, which is then shaped into a solid polymer part, the sodium chloride is later washed out by immersing the solid molded part in water for some time, to leave small inter-connected holes in relatively high density polymer products.

(f) We have found that the above five mechanisms can all be used to create pores in the graphene materials while they are in a solid state. Another mechanism of producing pores in a graphene material is through the generation and vaporization of volatile gases by removing those non-carbon elements in a high-temperature environment. This is a unique self-foaming process that has never been previously taught or suggested.

In some embodiments, the graphene material in the dispersion is selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof. The starting graphitic material for producing any one of the above graphene materials may be selected from natural graphite, artificial graphite, mesophase carbon, mesophase pitch, mesocarbon microbead, soft carbon, hard carbon, coke, carbon fiber, carbon nanofiber, carbon nanotube, or a combination thereof. The production of various graphene materials can be conducted by known processes that are reviewed in literature: e.g. Bor Z. Jang and A Zhamu, "Processing of Nano Graphene Platelets (NGPs) and NGP Nanocomposites: A Review," J. Materials Sci. 43 (2008) 5092-5101.

For the purpose of defining the claims of the instant application, NGPs or graphene materials include discrete sheets/platelets of single-layer and multi-layer (typically less than 10 layers) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials.

In order to illustrate how the presently invented process works to produce a graphene foam-protected anode layer, we herein make use of graphene oxide (GO) and graphene fluoride (GF) as two examples. These should not be construed as limiting the scope of our claims. In each case, the first step involves preparation of a graphene dispersion (e.g. GO+water or GF+organic solvent, DMF) containing an optional blowing agent. If the graphene material is pristine graphene containing no non-carbon elements, a blowing agent is needed. Starting Si particles (50 nm to 50 µm in diameter) are also dispersed into this graphene suspension.

In the second step, the GF or GO suspension containing Si particles therein is formed into a wet GF or GO layer on a solid substrate surface (e.g. PET film or glass) preferably under the influence of a shear stress. One example of such a shearing procedure is casting or coating a thin film of GF or GO suspension using a coating machine. This procedure is similar to a layer of varnish, paint, coating, or ink being coated onto a solid substrate. The roller or wiper creates a shear stress when the film is shaped, or when there is a high relative motion between the roller/blade/wiper and the supporting substrate. Quite unexpectedly and significantly, such a shearing action enables the planar GF or GO sheets to well align along, for instance, a shearing direction. Further surprisingly, such a molecular alignment state or preferred orientation is not disrupted when the liquid components in the GF or GO suspension are subsequently removed to form a well-packed layer of highly aligned GF or GO sheets that are at least partially dried. The dried GF or GO mass has a high birefringence coefficient between an in-plane direction and the normal-to-plane direction.

In an embodiment, this GF or GO layer, each containing Si particles therein, is then subjected to a heat treatment to activate the blowing agent and/or the thermally-induced reactions that remove the non-carbon elements (e.g. F, O, etc.) from the graphene sheets to generate volatile gases as by-products. These volatile gases generate pores or bubbles inside the solid graphene material, pushing solid graphene sheets into a foam wall structure, forming a graphene oxide foam. If no blowing agent is added, the non-carbon elements in the graphene material preferably occupy at least 10% by weight of the graphene material (preferably at least 20%, and further preferably at least 30%). The first (initial) heat treatment temperature is typically greater than 80° C., preferably greater than 100° C., more preferably greater than 300° C., further more preferably greater than 500° C. and can be as high as 1,500° C. The blowing agent is typically activated at a temperature from 80° C. to 300° C., but can be higher. The foaming procedure (formation of pores, cells, or bubbles) is typically completed within the temperature range of 80-1,500° C. Quite surprisingly, the chemical linking or merging between graphene planes (GO or GF planes) in an edge-to-edge and face-to-face manner can occur at a relatively low heat treatment temperature (e.g. even as low as from 150 to 300° C.).

If the graphene material is selected from the group of non-pristine graphene materials consisting of graphene oxide, reduced graphene oxide, graphene fluoride, graphene chloride, graphene bromide, graphene iodide, hydrogenated graphene, nitrogenated graphene, chemically functionalized graphene, or a combination thereof, and wherein the maximum heat treatment temperature (e.g. both the first and second heat treatment temperatures) is (are) less than 2,500° C., then the resulting solid graphene foam typically contains a content of non-carbon elements in the range from 0.01% to 2.0% by weight (non-pristine graphene foam).

The mass of graphene foam-protected Si nanowires is then broken up by operating a mechanical breaking means to produce the Si nanowire/graphene hybrid material in a powder mass form.

The mechanical breaking means may be selected from an air jet mill, high-shear mixer/disperser, ultrasonicator, vibratory ball mill, planetary ball mill, high energy mill, basket mill, agitator ball mill, cryogenic ball mill, microball mill, tumbler ball mill, continuous ball mill, stirred ball mill, pressurized ball mill, attritor, plasma-assisted ball mill, freezer mill, vibratory sieve, bead mill, nanobead mill, ultrasonic homogenizer mill, centrifugal planetary mixer, vacuum ball mill, or resonant acoustic mixer.

After this mechanical breaking operation, the resulting product is typically a powder mass (e.g. FIG. 4(C)) containing a uniform mixture of Si nanowires and graphene sheets. The process may further include a step of separating Si nanowires from graphene sheets. Such a separation step can be readily conducted using a well-known procedure or equipment, such as a powder classifier (e.g. cyclone), mechanical shaking or screening, gravitation-driven differential sedimentation, or any density difference-based separation.

In certain embodiments, the graphene/Si nanowire hybrid material, in a solid powder form, produced by the presently invented process may be re-dispersed in a liquid medium, such as water or an organic solvent, to form a suspension. An organic material (e.g. petroleum or coal tar pitch) or polymer may be optionally added into the suspension, preferably dissolved therein. The resulting suspension can be converted into micron-scaled droplets (particulates) using several approaches.

For instance, the suspension may be aerosolized or atomized to form fine aerosol particles. Concurrently or subsequently, the liquid or solvent is removed to form solid particles that are typically spherical or ellipsoidal in shape with a diameter or major axis typically less than 10 μm. This procedure may be executed by using an aerosol generation, atomization, spray drying, or inkjet printing apparatus. As an optional procedure, the solid particles may be simultaneously or subsequently subjected to a pyrolysis or carbonization treatment to convert the organic or polymeric material, if existing, into a carbon material (e.g. amorphous carbon or polymeric carbon). The heat treatment of petroleum or coal-based heavy oil or pitch will serve to convert at least part of the oil or pitch into a mesophase, an optically anisotropic or liquid crystalline phase of a fused aromatic ring structure. The converted pitch is called a mesophase pitch, which may be further carbonized. Since graphene sheets are essentially graphitic materials having a high thermal stability, this low temperature heat treatment (350-1,200° C.) has no adverse effect on the graphene structure. Essentially, one can use a spray pyrolysis technique, such as ultrasonic spray pyrolysis or electrospray pyrolysis, to accomplish both the aerosol generation and pyrolysis procedures.

In this process of re-dispersion and particulate formation, the suspension may further contain a conductive material selected from a conducting polymer, carbon nanotube, carbon nanofiber, carbon black, coke, acetylene black, activated carbon, expanded graphite flake, artificial graphite particle, natural graphite particle, or a combination thereof and the core further contains this conductive material.

The present invention also provides a powder mass of a graphene/Si nanowire hybrid material for a lithium-ion battery anode active material, the powder mass comprising multiple Si nanowires inter-mixed with multiple graphene sheets wherein the Si nanowires have a diameter from 2 nm to 100 nm (mostly <50 nm) and a length from 50 nm to 30 μm (mostly <20 μm), and the Si nanowires are in an amount from 0.5% to 99% by weight based on the total weight of said graphene sheets and said Si nanowires combined. The Si nanowires in the invented hybrid powder mass are curly in shape and have a radius of curvature from 100 nm to 10 μm and more typically from 200 nm to 2 μm. Preferably, in the powder mass, the Si nanowires have a diameter from 10 nm to 40 nm and a length from 100 nm to 10 μm. These Si nanowires may be readily separated from graphene sheets to obtain pure Si nanowires.

In the powder mass, the graphene sheets may contain a pristine graphene material having less than 0.01% by weight of non-carbon elements or a non-pristine graphene material having 0.01% to 50% by weight of non-carbon elements, wherein said non-pristine graphene is selected from graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof.

The graphene sheets may be selected from a single-layer sheet or few-layer platelet of pristine graphene, graphene oxide, reduced graphene oxide, graphene fluoride, graphene bromide, graphene iodide, boron-doped graphene, nitrogen-doped graphene, chemically functionalized graphene, or a combination thereof, wherein few layer is defined as less than 10 layers of graphene planes.

In certain preferred embodiments, the powder mass comprises multiple secondary particles or particulates and at least one of the particulates comprises a core and a shell embracing the core, wherein the core comprises a single or a plurality of graphene sheets and a plurality of Si nanowires and the graphene sheets and the Si nanowires are mutually bonded or agglomerated into the core and the shell comprises one or a plurality of graphene sheets.

The core may further comprise contains a conductive material selected from a carbon material (e.g. polymeric carbon or carbonized resin), conducting polymer, carbon nanotube, carbon nanofiber, carbon black, coke, acetylene black, activated carbon, expanded graphite flake, artificial graphite particle, natural graphite particle, or a combination thereof.

The invention also provides an anode comprising the invented powder mass as an anode active material, an optional conductive additive, and a resin binder. The invention further provides a lithium-ion battery comprising this anode, a cathode, and an electrolyte.

The following examples are used to illustrate some specific details about the best modes of practicing the instant invention and should not be construed as limiting the scope of the invention.

Example 1

Various Blowing Agents and Pore-Forming (Bubble-Producing) Processes

In the field of plastic processing, chemical blowing agents are mixed into the plastic pellets in the form of powder or pellets and dissolved at higher temperatures. Above a certain temperature specific for blowing agent dissolution, a gaseous reaction product (usually nitrogen or $CO_2$) is generated, which acts as a blowing agent. However, a chemical blowing agent cannot be dissolved in a graphene material, which is a solid, not liquid. This presents a challenge to make use of a chemical blowing agent to generate pores or cells in a graphene material.

After extensive experimenting, we have discovered that practically any chemical blowing agent (e.g. in a powder or pellet form) can be used to create pores or bubbles in a dried layer of graphene when the first heat treatment temperature is sufficient to activate the blowing reaction. The chemical blowing agent (powder or pellets) may be dispersed in the liquid medium to become a second dispersed phase (sheets of graphene material being the first dispersed phase) in the suspension, which can be deposited onto the solid supporting substrate to form a wet layer. This wet layer of graphene material may then be dried and heat treated to activate the chemical blowing agent. After a chemical blowing agent is activated and bubbles are generated, the resulting foamed graphene structure is largely maintained even when subsequently a higher heat treatment temperature is applied to the structure. This is quite unexpected, indeed.

Chemical foaming agents (CFAs) can be organic or inorganic compounds that release gasses upon thermal decomposition. CFAs are typically used to obtain medium- to high-density foams, and are often used in conjunction with physical blowing agents to obtain low-density foams. CFAs can be categorized as either endothermic or exothermic, which refers to the type of decomposition they undergo. Endothermic types absorb energy and typically release carbon dioxide and moisture upon decomposition, while the exothermic types release energy and usually generate nitrogen when decomposed. The overall gas yield and pressure of gas released by exothermic foaming agents is often higher than that of endothermic types. Endothermic CFAs are generally known to decompose in the range from 130 to 230° C. (266-446° F.), while some of the more common exothermic foaming agents decompose around 200° C. (392° F.). However, the decomposition range of most exothermic CFAs can be reduced by addition of certain compounds. The activation (decomposition) temperatures of CFAs fall into the range of our heat treatment temperatures. Examples of suitable chemical blowing agents include sodium bi-carbonate (baking soda), hydrazine, hydrazide, azodicarbonamide (exothermic chemical blowing agents), nitroso compounds (e.g. N,N-Dinitroso pentamethylene tetramine), hydrazine derivatives (e.g. 4,4'-Oxybis (benzenesulfonyl hydrazide) and Hydrazo dicarbonamide), and hydrogen carbonate (e.g. Sodium hydrogen carbonate). These are all commercially available in plastics industry.

In the production of foamed plastics, physical blowing agents are metered into the plastic melt during foam extrusion or injection molded foaming, or supplied to one of the precursor materials during polyurethane foaming. It has not been previously known that a physical blowing agent can be used to create pores in a graphene material, which is in a solid state (not melt). We have surprisingly observed that a physical blowing agent (e.g. $CO_2$ or $N_2$) can be injected into the stream of graphene suspension prior to being coated or cast onto the supporting substrate. This would result in a foamed structure even when the liquid medium (e.g. water and/or alcohol) is removed. The dried layer of graphene material is capable of maintaining a controlled amount of pores or bubbles during liquid removal and subsequent heat treatments.

Technically feasible blowing agents include Carbon dioxide ($CO_2$), Nitrogen ($N_2$), Isobutane ($C_4H_{10}$), Cyclopentane ($C_5H_{10}$), Isopentane ($C_5H_{12}$), CFC-11 ($CFCl_3$), HCFC-22 ($CHF_2Cl$), HCFC-142b ($CF_2ClCH_3$), and HCFC-134a ($CH_2FCF_3$). However, in selecting a blowing agent, environmental safety is a major factor to consider. The Montreal Protocol and its influence on consequential agreements pose a great challenge for the producers of foam. Despite the effective properties and easy handling of the formerly applied chlorofluorocarbons, there was a worldwide agreement to ban these because of their ozone depletion potential (ODP). Partially halogenated chlorofluorocarbons are also not environmentally safe and therefore already forbidden in many countries. The alternatives are hydrocarbons, such as isobutane and pentane, and the gases such as $CO_2$ and nitrogen.

Except for those regulated substances, all the blowing agents recited above have been tested in our experiments. For both physical blowing agents and chemical blowing agents, the blowing agent amount introduced into the suspension is defined as a blowing agent-to-graphene material weight ratio, which is typically from 0/1.0 to 1.0/1.0.

Example 2

Preparation of Discrete Functionalized GO Sheets and Graphene Foam

Chopped graphite fibers with an average diameter of 12 μm and natural graphite particles were separately used as a starting material, which was immersed in a mixture of concentrated sulfuric acid, nitric acid, and potassium permanganate (as the chemical intercalate and oxidizer) to prepare graphite intercalation compounds (GICs). The starting material was first dried in a vacuum oven for 24 h at 80° C. Then, a mixture of concentrated sulfuric acid, fuming nitric acid, and potassium permanganate (at a weight ratio of 4:1:0.05) was slowly added, under appropriate cooling and stirring, to a three-neck flask containing fiber segments. After 5-16 hours of reaction, the acid-treated graphite fibers or natural graphite particles were filtered and washed thoroughly with deionized water until the pH level of the solution reached 6. After a drying treatment at 100° C. overnight, the resulting graphite intercalation compound (GIC) or graphite oxide fiber was re-dispersed in water-alcohol to form a slurry.

In one sample, five grams of the graphite oxide fibers were mixed with 2,000 ml alcohol solution consisting of alcohol and distilled water with a ratio of 15:85 to obtain a slurry mass. Then, the mixture slurry was subjected to ultrasonic irradiation with a power of 200 W for various lengths of time. After 20 minutes of sonication, GO fibers were effectively exfoliated and separated into thin graphene oxide sheets with oxygen content of approximately 23%-31% by weight. Ammonia water was added to one pot of the resulting suspension, which was ultrasonicated for another hour to produce $NH_2$-functionalized graphene oxide (f-GO). The GO sheets and functionalized GO sheets were separately diluted to a weight fraction of 5% and a desired amount of Si particles (0.6-2.5 μm in diameter) was added to the suspensions. On a separate basis, a metal salt solution of cobalt carboxylate and manganese carboxylate (as a catalyst metal precursor) in water was prepared. The metal salt solution, along with 2% baking soda as a blowing agent, was then added to the GO/Si or f-GO/Si suspensions to form mixture slurries. The resulting slurries were allowed to stay in the container without any mechanical disturbance for 2 days.

The resulting slurries containing GO/Si/metal salt or f-GO/Si/metal salt were then comma-coated onto a PET film surface. The resulting coating films of GO/Si/metal salt or f-GO/Si/metal salt, after removal of liquid, have a thickness that was from 100 to 800 μm. The films were then subjected to heat treatments that involve an initial heat treatment temperature of 500° C. for 2 hours (in a mixture of $H_2$ and $N_2$) to enable formation of a foamed structure and deposition of Co or Mn on surfaces of both Si particles and pore walls. This is followed by exposing the foam at a second temperature of 800-1,200° C. (in Ar gas atmosphere) for different specimens to induce growth of Si nanowires from both Si particles and pore walls.

The mass of graphene foam-enclosed Si nanowires were then subjected to air-jet mill for breaking up the foam structure to recover a powder mass of Si nanowire-graphene mixture.

Example 3

Preparation of Single-Layer Graphene Sheets from Mesocarbon Microbeads (MCMBs) and Graphene Foam Mesocarbon microbeads (MCMBs) were supplied from China Steel Chemical Co., Kaohsiung, Taiwan. This material has a density of about 2.24 $g/cm^3$ with a median particle size of about 16 μm. MCMB (10 grams) were intercalated with an acid solution (sulfuric acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulfate ions. The sample was then washed repeatedly with deionized water until the pH of the filtrate was no less than 4.5. The slurry was then subjected ultra-sonication for 10-100 minutes to produce GO suspensions. TEM and atomic force microscopic studies indicate that most of the GO sheets were single-layer graphene when the oxidation treatment exceeded 72 hours, and 2- or 3-layer graphene when the oxidation time was from 48 to 72 hours.

The GO sheets contain oxygen proportion of approximately 35%-47% by weight for oxidation treatment times of 48-96 hours. GO sheets were suspended in water. Ni-coated Si particles (diameter of 1-6 μm) were added to the GO suspension. Baking soda (5-20% by weight), as a chemical blowing agent, was also added to the suspension just prior to casting. The suspension was then cast onto a glass surface using a doctor's blade to exert shear stresses, inducing GO sheet orientations. Several samples were cast, some containing a blowing agent and some not. The resulting GO films, after removal of liquid, have a thickness that can be varied from approximately 10 to 500 μm.

The several sheets of the GO film, with or without a blowing agent, were then subjected to heat treatments that involve an initial (first) thermal reduction temperature of 80-500° C. for 1-5 hours. This first heat treatment generated a graphene foam. The foam was then subjected to a second temperature of 750-950° C., enabling growth of Si nanowires from Si particles and from graphene sheet surfaces. A mechanical shearing device, a household food processor, was then used to break up the porous graphene structure to produce the graphene/Si nanowire hybrid material. For some amount of the hybrid, an ultracentrifuge was used to separate Si nanowires from graphene sheets that have different weights.

Example 4

Preparation of Pristine Graphene Foam (0% Oxygen)

Recognizing the high defect population in GO sheets acting to reduce the conductivity of individual graphene plane, we decided to study if the use of pristine graphene sheets (non-oxidized and oxygen-free, non-halogenated and halogen-free, etc.) can lead to a graphene foam having a higher thermal conductivity. Pristine graphene sheets were produced by using the direct ultrasonication or liquid-phase production process.

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. There are essentially no other non-carbon elements.

Sputtering was used for deposition of metal catalyst (e.g. Ni, Ag, and Ni/Ag mixture) onto Si particles and/or various graphene sheets (pristine graphene, RGO, and GO).

Various amounts (1%-30% by weight relative to graphene material) of chemical bowing agents (N,N-Dinitroso pentamethylene tetramine or 4,4'-Oxybis (benzenesulfonyl hydrazide) and metal-coated Si particles were added to a suspension containing pristine graphene sheets and a surfactant. The suspension was then slot die-coated onto a PET film surface, which involves shear stress-induced orientation of graphene sheets. The resulting graphene-Si films, after removal of liquid, have a thickness from approximately 100 to 750 μm.

The graphene films were then subjected to heat treatments that involve an initial (first) temperature of 80-1,500° C. for 1-5 hours, which led to the production of a graphene foam layer. Some of the pristine foam samples were then subjected to a heat treatment at a second temperature of 700-2,500° C. to induce growth of Si nanowires from Si particles. A ball mill was used to break up the graphene foam structure to obtain the graphene/Si nanowire hybrid. When the ball milling time was extended to go beyond 1 hour, the Si nanowires were reduced in length to become typically from 100 nm to 2 μm, more typically less than 1 μm if longer than 2 hours.

Example 5

Preparation of Graphene Oxide (GO) Suspension from Natural Graphite and Subsequent Preparation of GO Foams Graphite oxide was prepared by oxidation of graphite flakes with an oxidizer liquid consisting of sulfuric acid, sodium nitrate, and potassium permanganate at a ratio of 4:1:0.05 at 30° C. When natural graphite flakes (particle sizes of 14 μm) were immersed and dispersed in the oxidizer mixture liquid for 48 hours, the suspension or slurry appears and remains optically opaque and dark. After 48 hours, the reacting mass was rinsed with water 3 times to adjust the pH value to at least 3.0. A final amount of water was then added to prepare a series of GO-water suspensions. We observed that GO sheets form a liquid crystal phase when GO sheets occupy a weight fraction >3% and typically from 5% to 15%.

By dispensing and coating the GO suspension (containing metal-coated Si particles) on a polyethylene terephthalate (PET) film in a slurry coater and removing the liquid medium from the coated film we obtained a thin film of dried graphene oxide. Several GO film samples were then subjected to different heat treatments, which typically include a thermal reduction treatment at a first temperature of 100° C. to 500° C. for 1-10 hours, and at a second temperature of 750-1,500° C. for 0.5-5 hours, followed by a controlled cool-down procedure. With these heat treatments, also under a compressive stress, the GO films were transformed into graphene foam and Si nanowires were grown inside foam pores.

Example 6

Graphene Foams from Hydrothermally Reduced Graphene Oxide

A self-assembled graphene hydrogel (SGH) sample was prepared by a one-step hydrothermal method. In a typical procedure, the SGH can be easily prepared by heating 2 mg/mL of homogeneous graphene oxide (GO) aqueous dispersion, along with desired Ni-coated Si particles (200 nm to 3 μm in diameter) sealed in a Teflon-lined autoclave at 180° C. for 12 h. The SGH containing about 2.6% (by weight) graphene sheets and 97.4% water was then freeze-dried. Upon drying and heat treating at 1,000° C., the resulting graphene foam-Si nanowire mixture was then broken up using a ball mill.

Example 7

Preparation of Graphene Foams from Graphene Fluoride

Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). Pre-cooled Teflon reactor was filled with 20-30 mL of liquid pre-cooled $ClF_3$, the reactor was closed and cooled to liquid nitrogen temperature. Then, no more than 1 g of HEG was put in a container with holes for $ClF_3$ gas to access and situated inside the reactor. In 7-10 days a gray-beige product with approximate formula $C_2F$ was formed.

Subsequently, a small amount of FHEG (approximately 0.5 mg) was mixed with 20-30 mL of an organic solvent (methanol, ethanol, 1-propanol, 2-propanol, 1-butanol, tert-butanol, isoamyl alcohol) and a desired amount of nickel acetate (a precursor to Ni), and subjected to an ultrasound treatment (280 W) for 30 min, leading to the formation of homogeneous yellowish dispersions. Five minutes of sonication was enough to obtain a relatively homogenous dispersion, but longer sonication times ensured better stability.

Upon casting on a glass surface with the solvent removed, the dispersion became a brownish film formed on the glass surface. When GF films were heat-treated, fluorine was released as gases that helped to generate pores in the film. In some samples, a physical blowing agent ($N_2$ gas) was injected into the wet GF film while being cast. These samples exhibit much higher pore volumes or lower foam densities. Without using a blowing agent, the resulting graphene fluoride foams exhibit physical densities from 0.35 to 1.38 g/cm$^3$. When a blowing agent was used (blowing agent/GF weight ratio from 0.5/1 to 0.05/1), a density from 0.02 to 0.35 g/cm$^3$ was obtained. Typical fluorine contents are from 0.001% (HTT=2,500° C.) to 4.7% (HTT=350° C.), depending upon the final heat treatment temperature involved. In one procedure, a fluorine removal step was executed at 350-500° C., followed by a Si nanowire growth step at 900-950° C. An attritor was used to break up the foam structure and recover the graphene/Si nanowire hybrid material.

Example 8

Preparation of Graphene Foams from Nitrogenated Graphene

Graphene oxide (GO), synthesized in Example 2, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene:urea mass ratios of 1:0.5, 1:1 and 1:2 are designated as NGO-1, NGO-2 and NGO-3 respectively and the nitrogen contents of these samples were 14.7, 18.2 and 17.5 wt % respectively as found by elemental analysis. These nitrogenated graphene sheets remain dispersible in water. The resulting suspensions, containing copper nitrate and Si particles dispersed therein, were then cast, dried, and heat-treated initially at 200-350° C. as a first heat treatment temperature and subsequently treated at a second temperature of 850° C. The resulting nitrogenated graphene foams exhibit physical densities from 0.45 to 1.28 g/cm$^3$. Typical nitrogen contents of the foams are from 0.1% (HTT=850° C.) to 5.3% (HTT=350° C.), depending upon the final heat treatment temperature involved. The graphene foam-protected Si nanowires were broken up using an air jet mill.\ to obtain the graphene/Si nanowire hybrid material.

Example 9

Cycle Stability of Various Rechargeable Lithium Battery Cells

In lithium-ion battery industry, it is a common practice to define the cycle life of a battery as the number of charge-discharge cycles that the battery suffers a 20% decay in capacity based on the initial capacity measured after the required electrochemical formation. Summarized in Table 1 below are the cycle life data of a broad array of batteries featuring a presently invented anode active material containing a graphene/Si nanowires vs. other types of anode materials.

TABLE 1

Cycle life data of various lithium secondary (rechargeable) batteries.

| Sample ID | Protective material (type of graphene or conductive additive/binder) | Type & % of anode active material | Initial capacity (mAh/g) | Cycle life (No. of cycles) |
|---|---|---|---|---|
| SiNW-GO-1 | GO | 25% by wt. Si nanowires (31 nm diameter and 2-12 μm length) | 1,252 | 620 |
| SiNW-GO-1a | GO | 25% by wt. Si nanowires (31 nm diameter and 0.3-2 μm) | 1,256 | 980 |
| SiNW-GO-2 | GO | 25% by wt. Si nanowires (78 nm) | 1,242 | 454 |
| SiNW-GF-2 | Graphene fluoride | 35% Si nanowires (diameter = 21 nm; length = 1.5-10 μm) | 1,305 | 667 |
| SiNW-GF-2a | Graphene fluoride | 35% Si nanowires (diameter = 21 nm; length) | 1,311 | 1154 |
| SiNW-NG-3 | Nitrogenated graphene | 45% Si nanowires (26 nm diameter) | 1,778 | 842 |

These data further confirms the following special features or advantages of the instant invention:

(1) These data indicate that thinner Si nanowires appear to lead to significantly improved battery performance. Given the same diameter, shorter Si nanowires result in a longer cycle life.
(2) The graphene foam fabrication approach is very effective in promoting the growth of thin-diameter Si nanowires.

Example 10

Evaluation of Lithium-Ion Batteries Featuring Anodes Containing Si Nanowires in Pores of Graphene Foam For electrochemical testing, several types of anodes and cathodes were prepared. Typically, slurry coating was used to prepare electrodes. For instance, the working electrodes were prepared by mixing 85 wt. % active material (Si nanowire/graphene hybrid material, 7 wt. % acetylene black (Super-P), and 8 wt. % polyvinylidene fluoride (PVDF, 5 wt. % solid content) binder dissolved in N-methyl-2-pyrrolidinoe (NMP). After coating the slurries on Cu foil, the electrodes were dried at 120° C. in vacuum for 2 h to remove the solvent before pressing.

Then, the electrodes were cut into a disk ($\phi$=12 mm) and dried at 100° C. for 24 h in vacuum. Electrochemical measurements were carried out using CR2032 (3V) coin-type cells with lithium metal as the counter/reference electrode, Celgard 2400 membrane as separator, and 1 M LiPF$_6$ electrolyte solution dissolved in a mixture of ethylene carbonate (EC) and diethyl carbonate (DEC) (EC-DEC, 1:1 v/v). Various anode material compositions were evaluated, including those containing a simple mixture of Si particles and graphene sheets, Si nanowires grown from Si particles with or without the help from metal-coated graphene sheets (in a simple mixture or in a presently invented graphene foam containing protected Si nanowires). The cell assembly was performed in an argon-filled glove-box. The CV measurements were carried out using an electrochemical workstation at a scanning rate of 1 mV/s. The electrochemical performance of graphene-Si nanowire hybrid was also evaluated by galvanostatic charge/discharge cycling at a current density of 50-1,000 mA/g, using a LAND electrochemical workstation. Full-cell pouch configurations using lithium iron phosphate and lithium cobalt oxide cathodes were also prepared and tested.

Figure 5:
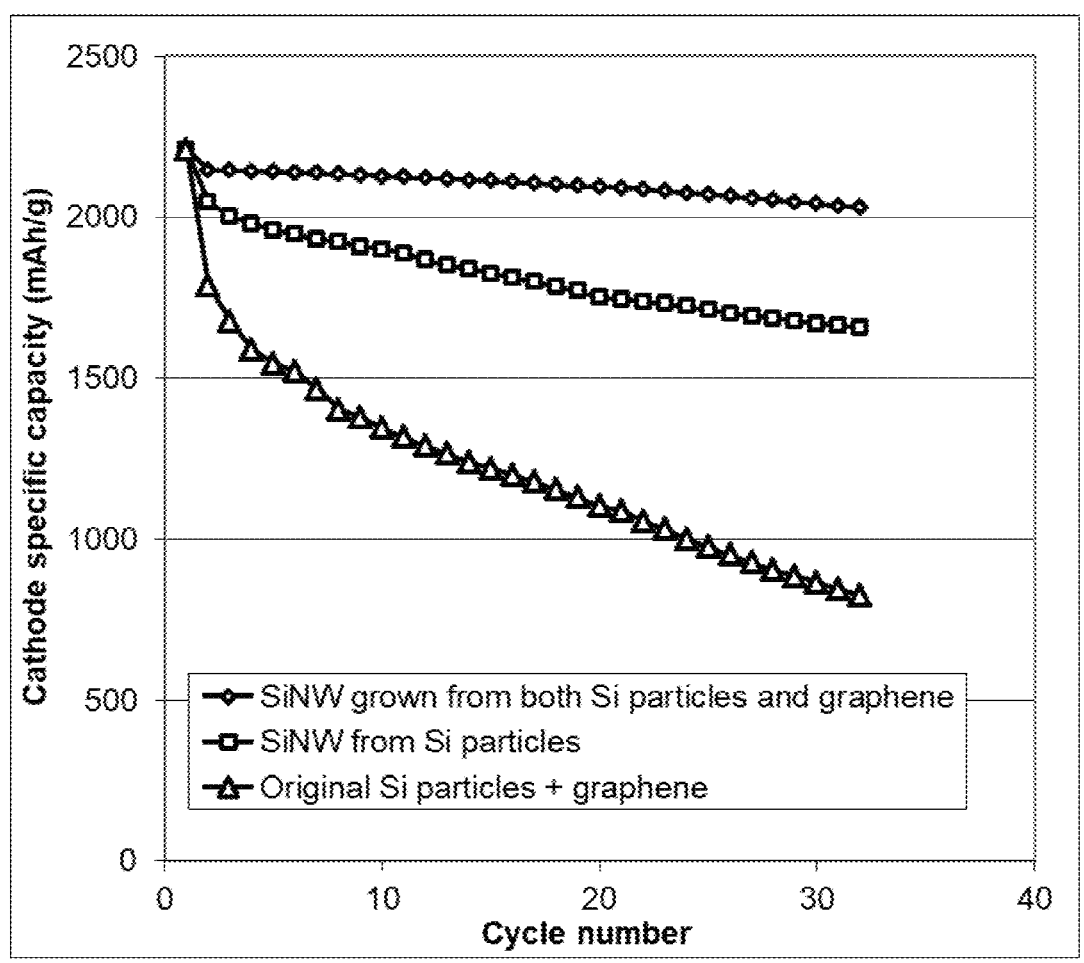
FIG. 5 Cycling test results of two lithium-ion cells: The first battery cell contains a Si nanowire/graphene hybrid, wherein Si nanowires (diameter of 60-90 nm) were grown from Ni metal-coated Si particles originally residing in pores of a graphene foam made of un-coated graphene sheets. The anode of the second cell contains a Si nanowire/graphene hybrid material, wherein the Si nanowires (diameter of 6-28 nm) were emanated from both Ni-coated Si particles and Ni-coated graphene sheets original inside pores of a graphene foam.

Shown in FIG. 5 are charge/discharge cycling test results of two lithium-ion cells in terms of the anode specific capacity plotted as a function of the cycle number. The first battery cell contains a Si nanowire/graphene hybrid, wherein Si nanowires (diameter of 60-90 nm) were grown from Ni metal-coated Si particles originally residing in pores of a graphene foam made of un-coated graphene sheets. The anode of the second cell contains a Si nanowire/graphene hybrid material, wherein the Si nanowires (diameter of 6-28 nm) were emanated from both Ni-coated Si particles and Ni-coated graphene sheets original inside pores of a graphene foam. These results demonstrate that the foam containing Si nanowires emanated from both Ni-coated Si particles and Ni-coated graphene sheets provide the most stable cycling behavior.

Figure 6:
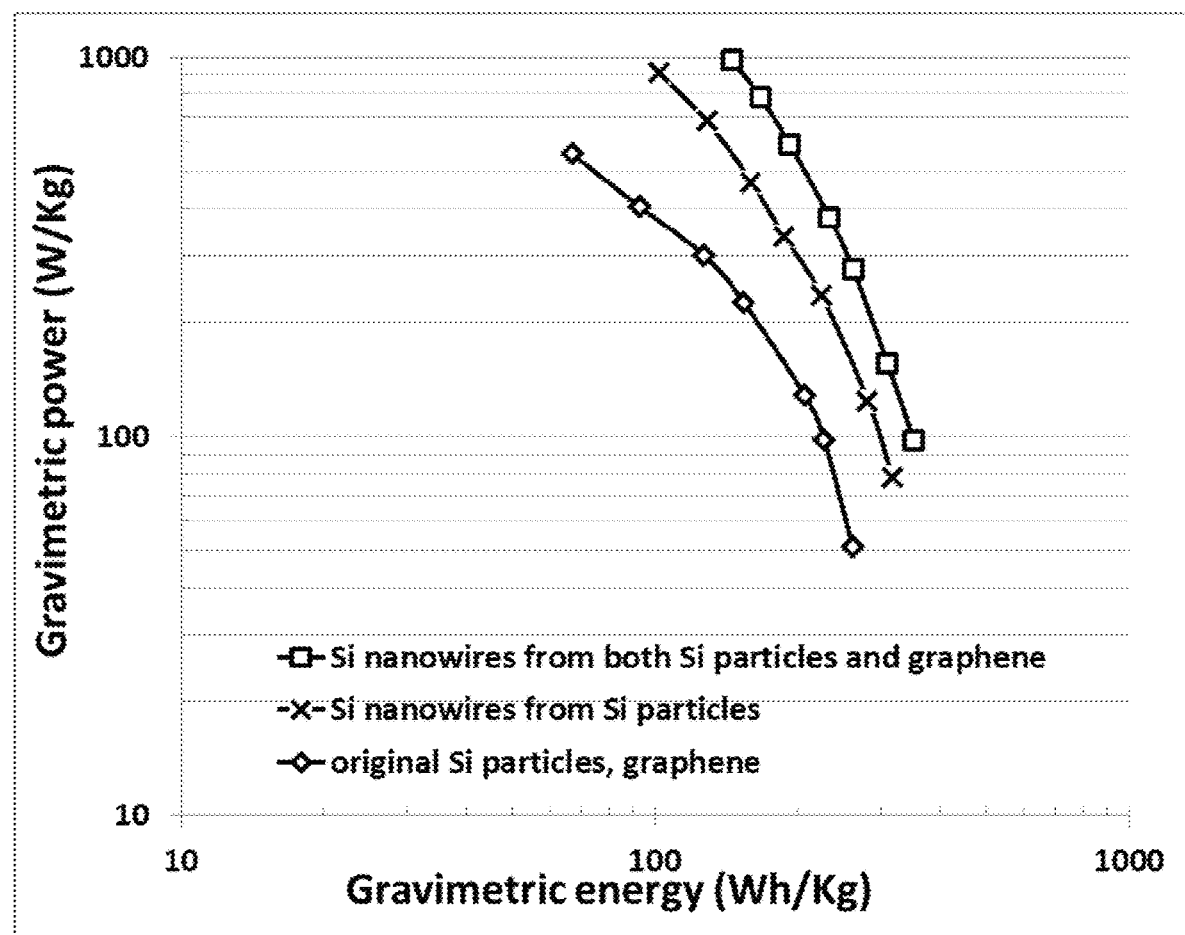
FIG. 6 Ragone plots (power density vs. energy density) of three lithium-ion cells: first cell containing an anode layer of graphene foam containing original Si particles (no Si nanowires) in pores of the foam, second cell containing Si nanowires grown from Ni metal-coated Si particles in pores of graphene foam made of un-coated graphene sheets, and third cell containing Si nanowires emanated from both Ni-coated Si particles and Ni-coated graphene sheets originally in a graphene foam.

FIG. 6 shows representative Ragone plots of three lithium-ion cells: first cell containing original Si particles and graphene sheets (no Si nanowires) as the anode active material in a graphene foam structure, second cell containing Si nanowires grown from Ni metal-coated Si particles and un-coated graphene sheets in a graphene foam structure, and third cell containing Si nanowires emanated from both Ni-coated Si particles and Ni-coated graphene sheets originally in a graphene foam structure (but broken up to obtain a graphene/Si nanowire hybrid). The cell featuring an anode active material containing a massive amount of small-diameter Si nanowires emanated from both metal-coated Si particles and metal-coated graphene sheets (pore walls) in a graphene foam exhibits both highest energy density and highest power density. The cell energy density of 353 Wh/kg is significantly higher than the typically 150-220 Wh/kg of prior art lithium-ion batteries. The power density of 897 W/kg is also much higher than the typically 300-500 W/kg. These are surprising and of high utility value.

Figure 7:
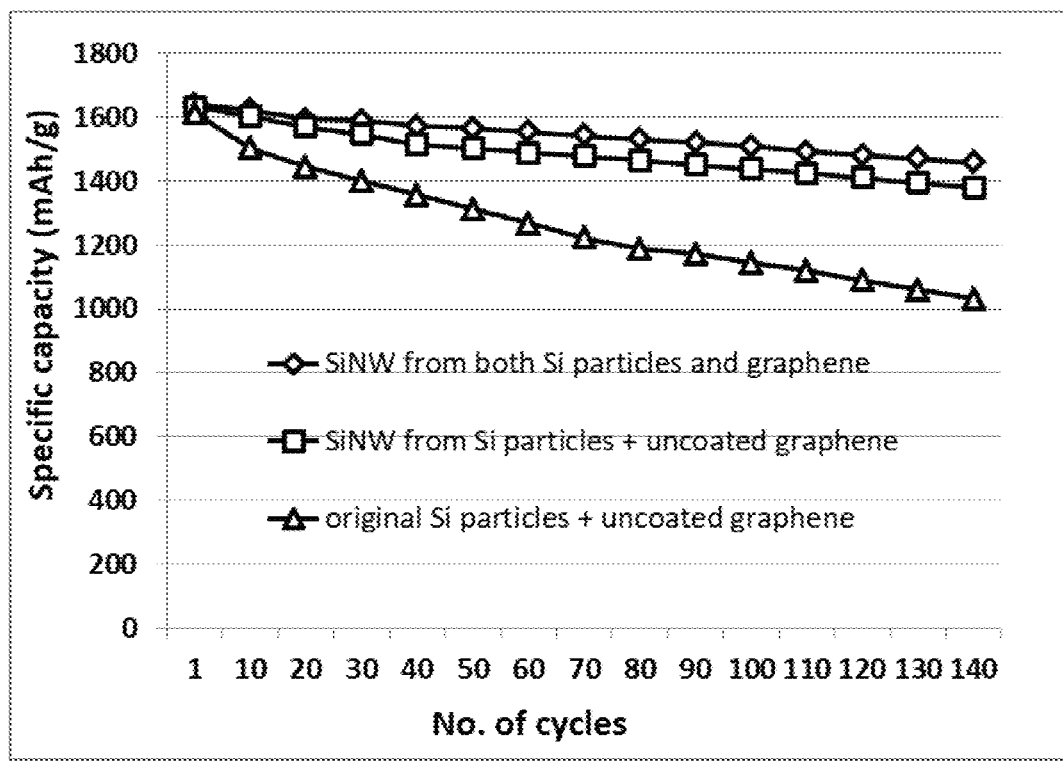
FIG. 7 Cycling test results of 3 lithium-ion cells: first cell containing original Si particles and graphene sheets simply mixed together (no Si nanowires) as the anode active material, second cell containing a simple mixture of Si nanowires grown from Ni/Al metal-coated Si particles and un-coated graphene sheets, third cell containing Si nanowires emanated from both Ni/Al-coated Si particles and Ni/Al-coated graphene sheets originally in a graphene foam layer.

FIG. 7 shows the cycling test results of three lithium-ion cells: first cell containing a simple mixture of original Si particles and graphene sheets (no Si nanowires) as the anode active material, second cell containing a simple mixture of Si nanowires grown from Ni/Al metal-coated Si particles and un-coated graphene sheets (Si nanowires grown in situ after mixing), third cell containing Si nanowires emanated from both Ni/Al-coated Si particles and Ni/Al-coated graphene sheets originally in a graphene foam (Si nanowires grown in situ after foam formation; graphene foam was broken up to obtain a graphene/Si nanowire hybrid). These results demonstrate that the approach of growing Si nanowires in pores of a graphene foam surprisingly provides the most stable cycling behavior for a lithium-ion battery.

We claim:

1. A process for producing a silicon (Si) nanowire/graphene hybrid material as a lithium-ion battery anode active material, said process comprising: (A) preparing a mixture of catalyst metal-coated Si particles, graphene sheets, and a blowing agent, wherein said Si particles have a particle diameter from 50 nm to 50 μm and said catalyst metal is in a form of nanoparticles having a diameter from 0.5 nm to 100 nm or a thin coating having a thickness from 0.5 nm to 100 nm deposited on surfaces of said Si particles and on surfaces of graphene sheets, and wherein said Si particles contain pure Si having at least 99.9% by weight of Si element or a Si alloy or mixture having from 70% to 99.9% by weight of Si therein; (B) exposing said mixture to a high temperature environment, including a temperature from 100° C. to 2,500° C., for a period of time sufficient to induce volatile gas molecules from said graphene sheets or to activate said blowing agent for producing a porous graphene structure or a graphene foam and to enable a catalyst metal-catalyzed growth of multiple Si nanowires emanating from said Si particles as a feed material to form an amount of graphene foam-protected or porous graphene structure-enclosed Si nanowires; wherein said Si nanowires have a diameter from 2 nm to 100 nm, a length from 50 nm to 20 μm, and a length-to-diameter aspect ratio of at least 5 and said Si nanowires are in an amount from 0.5% to 99% by weight based on the total weight of said graphene and said Si nanowires combined; and (C) operating a mechanical breaking means to mechanically break said graphene foam-protected or porous graphene structure-enclosed Si nanowires to produce said Si nanowire/graphene hybrid material in a powder mass form.

2. The process of claim 1, wherein said step (A) of preparing said mixture is conducted by (a) dispersing said catalyst metal-coated Si particles, graphene sheets, and optional blowing agent in a liquid medium to form a graphene/Si dispersion; and (b) dispensing and depositing said graphene/Si dispersion onto a surface of a supporting substrate to form a wet layer of graphene/Si mixture and partially or completely removing said liquid medium from the wet layer of graphene/Si mixture to form a dried layer of said mixture.

3. The process of claim 1, wherein said mechanical breaking means includes air jet mill, high-shear mixer/disperser, ultrasonicator, vibratory ball mill, planetary ball mill, high energy mill, basket mill, agitator ball mill, cryogenic ball mill, microball mill, tumbler ball mill, continuous ball mill, stirred ball mill, pressurized ball mill, attritor, plasma-assisted ball mill, freezer mill, vibratory sieve, bead mill, nanobead mill, ultrasonic homogenizer mill, centrifugal planetary mixer, vacuum ball mill, or resonant acoustic mixer.

4. The process of claim 1, wherein said graphene sheets contain a pristine graphene material having less than 0.01% by weight of non-carbon elements or a non-pristine graphene material having 0.01% to 50% by weight of non-carbon elements, wherein said non-pristine graphene is selected from graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof.

5. The process of claim 1, wherein surfaces of said graphene sheets are also deposited with said catalyst metal and Si nanowires are also grown and emanated from said graphene surfaces.

6. The process of claim 2, wherein said dispensing and depositing procedure includes subjecting said graphene/silicon dispersion to an orientation-inducing stress.

7. The process of claim 1, wherein said graphene sheets are selected from a single-layer sheet or few-layer platelet of pristine graphene, graphene oxide, reduced graphene oxide, graphene fluoride, graphene bromide, graphene iodide, boron-doped graphene, nitrogen-doped graphene, chemically functionalized graphene, or a combination thereof, wherein few layer is defined as less than 10 layers of graphene planes.

8. The process of claim 1, wherein said Si particles have a diameter or thickness from 50 nm to 20 μm.

9. The process of claim 1, wherein said catalyst metal-coated Si particles are produced by a step of depositing a catalyst metal on Si particle surfaces by a procedure of physical vapor deposition, chemical vapor deposition, sputtering, plasma deposition, laser ablation, plasma spraying, ultrasonic spraying, printing, electrochemical deposition, electrode plating, electrodeless plating, chemical plating, or a combination thereof.

10. The process of claim 1, wherein said catalyst metal is selected from Cu, Ni, Co, Mn, Fe, Ti, Al, Ag, Au, Pt, Pd, or a combination thereof.

11. The process of claim 2, wherein the layer of graphene foam-protected Si nanowires is made into a continuous-length roll sheet form having a thickness from 1 μm to 200 mm and a length of at least 1 meter long.

12. The process of claim 1, wherein said catalyst metal is deposited on Si and graphene sheet surfaces by a procedure including (a) dissolving or dispersing a catalytic metal precursor in a liquid to form a precursor solution, (b) bringing said precursor solution in contact with surfaces of said graphene sheets and surfaces of said Si particles, (c) removing said liquid; and (d) chemically or thermally converting said catalytic metal precursor to said catalyst metal coating or nanoparticles.

13. The process of claim 12, wherein said step (d) of chemically or thermally converting said catalytic metal precursor is conducted concurrently with the procedure (c) of exposing said dried layer of graphene/Si mixture to a high temperature environment.

14. The process of claim 12, wherein said catalytic metal precursor is a salt or organo-metal molecule of a transition metal selected from Cu, Ni, Co, Mn, Fe, Ti, Al, or a combination thereof.

15. The process of claim 12, wherein said catalytic metal precursor is selected from copper nitrate, nickel nitrate, cobalt nitrate, manganese nitrate, iron nitrate, titanium nitrate, aluminum nitrate, copper acetate, nickel acetate, cobalt acetate, manganese acetate, iron acetate, titanium acetate, aluminum acetate, copper sulfate, nickel sulfate, cobalt sulfate, manganese sulfate, iron sulfate, titanium sulfate, aluminum sulfate, copper phosphate, nickel phosphate, cobalt phosphate, manganese phosphate, iron phosphate, titanium phosphate, aluminum phosphate, copper hydroxide, nickel hydroxide, cobalt hydroxide, manganese hydroxide, iron hydroxide, titanium hydroxide, aluminum hydroxide, copper carboxylate, nickel carboxylate, cobalt carboxylate, manganese carboxylate, iron carboxylate, titanium carboxylate, aluminum carboxylate, or a combination thereof.

16. The process of claim 1, wherein said procedure of exposing said mixture to a high temperature environment is conducted in a protective atmosphere of an inert gas, nitrogen gas, hydrogen gas, a mixture thereof, or in a vacuum.

17. The process of claim 1, further comprising a step of separating Si nanowires from said graphene sheets.

18. The process of claim 1, further comprising a step of reducing a length of said Si nanowires to a range from 20 nm to 1 μm.

19. The process of claim 3, wherein said an air jet mill, high-shear mixer/disperser, ultrasonicator, vibratory ball mill, planetary ball mill, high energy mill, basket mill, agitator ball mill, cryogenic ball mill, microball mill, tumbler ball mill, continuous ball mill, stirred ball mill, pressurized ball mill, attritor, plasma-assisted ball mill, freezer mill, vibratory sieve, bead mill, nanobead mill, ultrasonic homogenizer mill, centrifugal planetary mixer, vacuum ball mill, or resonant acoustic mixer is operated with an intensity and a length of time to reduce said Si nanowires to a length from 20 nm to 1 μm.

20. The process of claim 1, further comprising a step of dispersing said Si nanowire/graphene hybrid material and an optional organic or polymeric material in a liquid medium to obtain a suspension and then converting said suspension into multiple secondary particles or particulates, wherein at least one of said particulates comprises a core and a shell embracing said core wherein said core comprises a single or a plurality of graphene sheets and a plurality of Si nanowires and the graphene sheets and the Si nanowires are mutually bonded or agglomerated into said core and said shell comprises one or a plurality of graphene sheets.

21. The process of claim 20, wherein said step of converting said suspension into multiple secondary particles or particulates comprises a procedure selected from spray-drying, spray-pyrolysis, fluidized-bed drying, atomization, or aerosolizing.

22. The process of claim 20, further comprising a step of thermally converting said organic or polymeric material into a carbon material which is in electronic contact with said Si nanowires and/or said graphene sheets.

23. The process of claim 20, wherein said suspension further contains a conductive material selected from a conducting polymer, carbon nanotube, carbon nanofiber, carbon black, coke, acetylene black, activated carbon, expanded graphite flake, artificial graphite particle, natural graphite particle, or a combination thereof and said core further contains said conductive material.

24. The process of claim 1, further comprising a step of mixing said Si nanowire/graphene hybrid material with a binder resin and an optional conductive additive to make an anode electrode, which is optionally deposited on a surface of a current collector.

25. The process of claim 24, further comprising a step of combining said anode electrode, a cathode electrode, and an electrolyte to form a lithium-ion battery.

26. A process for producing a silicon (Si) nanowire/graphene hybrid material as a lithium-ion battery anode active material, said process comprising: (A) preparing a precursor mixture of multiple Si particles, graphene sheets, a catalytic metal precursor, and an optional blowing agent, wherein said Si particles have a diameter from 50 nm to 50 μm and contain pure Si having at least 99.9% by weight of Si element or a Si alloy or mixture having from 70% to 99.9% by weight of Si therein; (B) exposing said precursor mixture to a high temperature environment, from 100° C. to 2,500° C., for a period of time sufficient to thermally convert said catalytic metal precursor to a coating or nanoparticles of a catalyst metal deposited on surfaces of Si particles and/or surfaces of graphene sheets, to induce volatile gas molecules from said graphene sheets or to activate said blowing agent for producing a graphene foam or a porous graphene structure, and to enable a catalyst metal-catalyzed growth of multiple Si nanowires emanating from said Si particles as a feed material to form an amount of graphene foam-protected or porous graphene structure-enclosed Si nanowires; wherein said Si nanowires have a diameter from 5 nm to 100 nm, a length from 50 nm to 20 μm, and a length-to-diameter aspect ratio of at least 5, and said Si nanowires are in an amount from 0.5% to 95% by weight based on the total weight of said graphene and said Si nanowires combined; and (C) operating a mechanical breaking means to produce said Si nanowire/graphene hybrid material in a powder mass form.

27. The process of claim 26, wherein said step (A) of preparing said precursor mixture is conducted by (a) dispersing said Si particles, graphene sheets, catalytic metal precursor, and optional blowing agent in a liquid to form a precursor dispersion; and (b) dispensing and depositing said precursor dispersion onto a surface of a supporting substrate to form a wet layer of precursor mixture and partially or completely removing said liquid medium from the wet layer of precursor mixture to form a dried layer of precursor mixture, containing said Si particles, graphene sheets, catalytic metal precursor, and optional blowing agent that are well-dispersed together.

28. The process of claim 26, wherein said mechanical breaking means includes air jet mill, high-shear mixer/disperser, ultrasonicator, vibratory ball mill, planetary ball mill, high energy mill, basket mill, agitator ball mill, cryogenic ball mill, microball mill, tumbler ball mill, continuous ball mill, stirred ball mill, pressurized ball mill, attritor, plasma-assisted ball mill, freezer mill, vibratory sieve, bead mill, nanobead mill, ultrasonic homogenizer mill, centrifugal planetary mixer, vacuum ball mill, or resonant acoustic mixer.

29. The process of claim 26, wherein said catalytic metal precursor is a salt or organo-metal molecule of a transition metal selected from Cu, Ni, Co, Mn, Fe, Ti, Al, or a combination thereof.

30. The process of claim 26, wherein said catalytic metal precursor is selected from copper nitrate, nickel nitrate, cobalt nitrate, manganese nitrate, iron nitrate, titanium nitrate, aluminum nitrate, copper acetate, nickel acetate, cobalt acetate, manganese acetate, iron acetate, titanium acetate, aluminum acetate, copper sulfate, nickel sulfate, cobalt sulfate, manganese sulfate, iron sulfate, titanium sulfate, aluminum sulfate, copper phosphate, nickel phosphate, cobalt phosphate, manganese phosphate, iron phosphate, titanium phosphate, aluminum phosphate, copper hydroxide, nickel hydroxide, cobalt hydroxide, manganese hydroxide, iron hydroxide, titanium hydroxide, aluminum hydroxide, copper carboxylate, nickel carboxylate, cobalt carboxylate, manganese carboxylate, iron carboxylate, titanium carboxylate, aluminum carboxylate, or a combination thereof.

31. The process of claim 26, wherein said procedure of exposing said precursor mixture to a high temperature environment is conducted in a protective atmosphere of an inert gas, nitrogen gas, hydrogen gas, a mixture thereof, or in a vacuum.

32. The process of claim 26, wherein said Si particles have a diameter or thickness from 50 nm to 0.2 μm or from 0.2 μm to 5 μm.

33. The process of claim 26, wherein said Si nanowires have a diameter from 5 nm to 50 nm and a length from 50 nm to 20 μm.

34. The process of claim 26, further comprising a step of separating Si nanowires from said graphene sheets.

35. The process of claim 28, wherein said air jet mill, high-shear mixer/disperser, ultrasonicator, vibratory ball mill, planetary ball mill, high energy mill, basket mill, agitator ball mill, cryogenic ball mill, microball mill, tumbler ball mill, continuous ball mill, stirred ball mill, pressurized ball mill, attritor, plasma-assisted ball mill, freezer mill, vibratory sieve, bead mill, nanobead mill, ultrasonic homogenizer mill, centrifugal planetary mixer, vacuum ball mill, or resonant acoustic mixer is operated with an intensity and a length of time to reduce said Si nanowires to a length from 20 nm to 1 μm.

36. The process of claim 26, further comprising a step of mixing said Si nanowire/graphene hybrid material with a binder resin and an optional conductive additive to make an anode electrode, which is optionally deposited on a surface of a current collector.

37. The process of claim 36, further comprising a step of combining said anode electrode, a cathode electrode, and an electrolyte to form a lithium-ion battery.

38. The process of claim 26, further comprising a step of dispersing said Si nanowire/graphene hybrid material and an optional organic or polymeric material in a liquid medium to obtain a suspension and then converting said suspension into multiple secondary particles or particulates, wherein at least one of said particulates comprises a core and a shell embracing said core wherein said core comprises a single or a plurality of graphene sheets and a plurality of Si nanowires and the graphene sheets and the Si nanowires are mutually bonded or agglomerated into said core and said shell comprises one or a plurality of graphene sheets.

39. The process of claim 38, wherein said step of converting said suspension into multiple secondary particles or particulates comprises a procedure selected from spray-drying, spray-pyrolysis, fluidized-bed drying, atomization, or aerosolizing.

40. The process of claim 26, further comprising a step of thermally converting said organic or polymeric material into a carbon material which is in electronic contact with said Si nanowires and/or said graphene sheets.

41. The process of claim 26, wherein said suspension further contains a conductive material selected from a conducting polymer, carbon nanotube, carbon nanofiber, carbon black, coke, acetylene black, activated carbon, expanded graphite flake, artificial graphite particle, natural graphite particle, or a combination thereof and said core further contains said conductive material.

* * * * *